United States Patent
Shinohara et al.

(10) Patent No.: US 11,590,457 B2
(45) Date of Patent: Feb. 28, 2023

(54) METHOD AND APPARATUS FOR MANUFACTURING SPIRAL-WOUND TYPE SEPARATION MEMBRANE ELEMENT

(71) Applicant: SUMITOMO CHEMICAL COMPANY, LIMITED, Tokyo (JP)

(72) Inventors: Satoshi Shinohara, Niihama (JP); Hisaaki Miyamoto, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 449 days.

(21) Appl. No.: 16/788,155

(22) Filed: Feb. 11, 2020

(65) Prior Publication Data

US 2020/0261859 A1 Aug. 20, 2020

(30) Foreign Application Priority Data

Feb. 14, 2019 (JP) .............................. JP2019-024534

(51) Int. Cl.
*B01D 67/00* (2006.01)
*B01D 63/10* (2006.01)
*B01D 69/10* (2006.01)
*B01D 69/12* (2006.01)

(52) U.S. Cl.
CPC ......... *B01D 67/0079* (2013.01); *B01D 63/10* (2013.01); *B01D 69/10* (2013.01); *B01D 69/12* (2013.01)

(58) Field of Classification Search
CPC .... B01D 69/10; B01D 67/0079; B01D 63/10; B01D 69/12; B01D 2313/04; B01D 2313/42; B01D 2313/10
See application file for complete search history.

(56) References Cited

U.S. PATENT DOCUMENTS

| | | | |
|---|---|---|---|
| 4,277,340 A | 7/1981 | Kanamaru et al. | |
| 2004/0124133 A1 | 7/2004 | Irie et al. | |
| 2017/0056833 A1 | 3/2017 | Nguyen et al. | |
| 2018/0133654 A1* | 5/2018 | Kodama | B01D 69/142 |
| 2019/0247794 A1 | 8/2019 | Nishi et al. | |
| 2019/0255487 A1 | 8/2019 | Nishi et al. | |

FOREIGN PATENT DOCUMENTS

| | | |
|---|---|---|
| JP | 2004-202371 A | 7/2004 |
| JP | 2005-279377 A | 10/2005 |
| WO | WO-2018/052124 A1 | 3/2018 |

OTHER PUBLICATIONS

Extended European Search Report dated Jul. 20, 2020 for corresponding European Patent Application No. 20156847.4.
Office Action issued in corresponding European Patent Application No. 20156847.4, dated Sep. 5, 2022.

* cited by examiner

*Primary Examiner* — Vishal V Vasisth
(74) *Attorney, Agent, or Firm* — Foley & Lardner LLP

(57) ABSTRACT

A manufacturing method for a separation membrane element is a manufacturing method for a spiral-wound type separation membrane element including a perforated hollow tube and a laminated body that includes a separation membrane and is wound around the hollow tube. The manufacturing method includes pressing a press member against a portion of the laminated body that is wound around the hollow tube. The pressing presses the press member to satisfy respective relations defined by formulas (1) and (2):

$$0.1 \times Ps1 \leq Pe \quad (1), \text{ and}$$

$$0.1 \times Ps2 \leq Pe \quad (2).$$

7 Claims, 9 Drawing Sheets

METHOD AND APPARATUS FOR MANUFACTURING SPIRAL-WOUND TYPE SEPARATION MEMBRANE ELEMENT

BACKGROUND OF THE INVENTION

Field of the Invention

The present invention relates to a method and an apparatus for manufacturing a spiral-wound type separation membrane element.

Description of the Background Art

It is known that a spiral-wound type separation membrane element is used for separating a specific fluid component from a source fluid such as liquid or gas (Japanese Patent Laying-Open Nos. 2004-202371 (Patent Document 1) and 2005-279377 (Patent Document 2), for example). Generally, a spiral-wound type separation membrane element has a structure in which a separation membrane, a feed-side channel member, and a permeate-side channel member, for example, are stacked together to form a laminated body and the laminated body is wound around a hollow tube. The spiral-wound type separation membrane element also includes a sealing part for preventing mixture of the source fluid and a permeate fluid having permeated the separation membrane.

SUMMARY OF THE INVENTION

An object of the present invention is to provide a method and an apparatus for manufacturing a spiral-wound type separation membrane element with improved reliability of the sealing part formed by a sealant.

The present invention provides a method and an apparatus for manufacturing a spiral-wound type separation membrane element as described in the following.

[1] A manufacturing method for a spiral-wound type separation membrane element, the spiral-wound type separation membrane element including:
a hollow tube which is perforated; and
a laminated body including a separation membrane, the laminated body being wound around the hollow tube,
the manufacturing method comprising a step of pressing a press member against a portion of the laminated body, the portion of the laminated body being wound around the hollow tube,
the laminated body including:
a separation membrane unit which is a stack of
a membrane leaf including the separation membrane arranged to have facing portions that face each other, and a feed-side channel member in which a source fluid flows, the feed-side channel member being interposed between the facing portions of the separation membrane, and
a permeate-side channel member in which a permeate fluid permeated through the separation membrane flows; and
a sealant disposed on at least one side of the separation membrane unit,
the sealant being disposed on a first-side portion, a second-side portion, and an end portion of the separation membrane unit,
the first-side portion and the second-side portion being to be located on respective opposite ends, in an axial direction, of the laminated body wound around the hollow tube to extend in a winding direction of the laminated body,
the end portion being to be located on outer one of ends extending in the axial direction of the laminated body wound around the hollow tube,
the step of pressing the press member against the portion of the laminated body being performed while rotating the hollow tube, and
satisfying respective relations defined by formulas (1) and (2):

$$0.1 \times Ps1 \leq Pe \quad (1),$$

$$0.1 \times Ps2 \leq Pe \quad (2),$$

where supposing that
the laminated body wound around the hollow tube at a time when the step of pressing is completed has
a first-side sealant region where the sealant disposed on the first-side portion of the separation membrane unit is located,
a second-side sealant region where the sealant disposed on the second-side portion of the separation membrane unit is located, and
an end sealant region where the sealant disposed on the end portion is located, wherein the end sealant region is located to extend between the first-side sealant region and the second-side sealant region, and that
a plurality of pressure measurement regions are defined successively along an entire length in the axial direction of the laminated body wound around the hollow tube, $Ps1$ is a maximum value of respective time-average pressing pressures in pressure measurement regions constituting a first-side pressure measurement region, the pressure measurement regions are a part of the plurality of pressure measurement regions and include at least a part of the first-side sealant region, the time-average pressing pressure in each pressure measurement region is a time average of a pressing pressure of 10 kPa or more applied to the pressure measurement region, for a time period for which the pressing pressure of 10 kPa or more is applied to the first-side pressure measurement region, $Ps2$ is a maximum value of respective time-average pressing pressures in pressure measurement regions constituting a second-side pressure measurement region, the pressure measurement regions are a part of the plurality of pressure measurement regions and include at least a part of the second-side sealant region, the time-average pressing pressure in each pressure measurement region is a time average of a pressing pressure of 10 kPa or more applied to the pressure measurement region, for a time period for which the pressing pressure of 10 kPa or more is applied to the second-side pressure measurement region, and $Pe$ is a maximum value of respective time-average pressing pressures in pressure measurement regions constituting an end pressure measurement region, the pressure measurement regions are a part of the plurality of pressure measurement regions and located between the first-side pressure measurement region and the second-side pressure measurement region, the time-average pressing pressure in each pressure measurement region is a time average of a pressing pressure of 10 kPa or more applied to the pressure measurement region, for a time period for which the pressing pressure of 10 kPa or more is applied to the end pressure measurement region.

[2] The manufacturing method for a spiral-wound type separation membrane element according to [1], wherein the step of pressing includes pressing the press member against the portion of the laminated body to further satisfy respective relations defined by formulas (3) and (4):

$$1.1 \times Ps1 \geq Pe \quad (3),$$

$$1.1 \times Ps2 \geq Pe \quad (4).$$

[3] The manufacturing method for a spiral-wound type separation membrane element according to [1] or [2], wherein the press member is at least one of a plate-shaped member, a rod-shaped member, and a roll that extend in an axial direction of the hollow tube.

[4] The manufacturing method for a spiral-wound type separation membrane element according to any one of [1] to [3], wherein
the press member is a plate-shaped member or a rod-shaped member that extends in an axial direction of the hollow tube, and
the step of pressing the press member against the portion of the laminated body being performed while curving the plate-shaped member or the rod-shaped member toward the hollow tube.

[5] The manufacturing method for a spiral-wound type separation membrane element according to any one of [1] to [4], the method further comprising winding an outer sheath around a wound body to form an outer-sheathed wound body, the wound body including the hollow tube and the laminated body wound around the hollow tube, wherein
the outer-sheathed wound body satisfies a relation defined by a formula (5):

$$0.8 \times Ds \leq Dc \leq Ds \quad (5)$$

where Ds and Dc are each a diameter of the outer-sheathed wound body, Ds is a diameter taken at opposite ends in the axial direction of the laminated body, and Dc is a diameter taken at a center in the axial direction.

[6] The manufacturing method for a spiral-wound type separation membrane element according to [5], the method further comprising a step of curing the sealant of the outer-sheathed wound body.

[7] The manufacturing method for a spiral-wound type separation membrane element according to any one of [1] to [6], wherein the separation membrane includes a resin layer containing a hydrophilic resin.

[8] The manufacturing method for a spiral-wound type separation membrane element according to [7], wherein
the source fluid is a gas containing water vapor and acid gas, and
the permeate fluid contains acid gas.

[9] The manufacturing method for a spiral-wound type separation membrane element according to [7] or [8], wherein the resin layer includes a substance reacting reversibly with acid gas.

[10] A manufacturing apparatus for a spiral-wound type separation membrane element,
the spiral-wound type separation membrane element including:
a hollow tube which is perforated; and
a laminated body including a separation membrane, the laminated body being wound around the hollow tube,
the apparatus comprising:
a support part configured to rotatably support opposite ends, in an axial direction, of the hollow tube;
a rotational driver part configured to rotate the hollow tube; and
a press part configured to be pressed against a portion of the laminated body, the portion being wound around the hollow tube,
the press part including:
a press member; and
a pressing pressure adjuster configured to adjust a pressing pressure applied by the press member against the laminated body,
the press member including:
a first-end press portion and a second-end press portion configured to be pressed against respective opposite end regions at opposite ends, in the axial direction, of the laminated body wound around the hollow tube; and
a central press portion located between the first-end press portion and the second-end press portion, wherein
the pressing pressure adjuster is configured to adjust the pressing pressure to satisfy respective relations defined by formulas (1') and (2'):

$$0.1 \times Ps1' \leq Pe' \quad (1'),$$

$$0.1 \times Ps2' \leq Pe' \quad (2'),$$

where supposing that a plurality of pressure measurement regions are defined successively along an entire length in the axial direction of the laminated body wound around the hollow tube,
Ps1' is a maximum value of respective time-average pressing pressures in one or more pressure measurement regions which are a part of the plurality of pressure measurement regions and against which the first-end press portion is pressed, the time-average pressing pressure in each pressure measurement region is a time average of a pressing pressure of 10 kPa or more applied to the pressure measurement region by the first-end press portion, for a time period for which the pressing pressure is applied,
Ps2' is a maximum value of respective time-average pressing pressures in one or more pressure measurement regions which are a part of the plurality of pressure measurement regions and against which the second-end press portion is pressed, the time-average pressing pressure in each pressure measurement region is a time average of a pressing pressure of 10 kPa or more applied to the pressure measurement region by the second-end press portion, for a time period for which the pressing pressure is applied, and
Pe' is a maximum value of respective time-average pressing pressures in one or more pressure measurement regions which are a part of the plurality of pressure measurement regions and against which the central press portion is pressed, the time-average pressing pressure in each pressure measurement region is a time average of a pressing pressure of 10 kPa or more applied to the pressure measurement region by the central press portion, for a time period for which the pressing pressure is applied.

[11] The manufacturing apparatus for a spiral-wound type separation membrane element according to [10], wherein
the pressing pressure adjuster is further configured to adjust the pressing pressure to satisfy respective relations defined by formulas (3') and (4'):

$$1.1 \times Ps1' \geq Pe' \quad (3'),$$

$$1.1 \times Ps2' \geq Pe' \quad (4').$$

[12] The manufacturing apparatus for a spiral-wound type separation membrane element according to [10] or [11], wherein
the press member is a plate-shaped member or a rod-shaped member that extends in the axial direction of the hollow tube, and the pressing pressure adjuster is configured to cause the plate-shaped member or the rod-shaped member to be curved toward the hollow tube.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3A is a developed schematic cross-sectional view of the wound body, FIG. 3B is a schematic view of the wound body, and FIG. 3C is a schematic view of the wound body with an outer sheath.

FIG. 4A is a schematic cross-sectional view of a separation membrane unit, FIG. 4B is a schematic cross-sectional view of the separation membrane unit on which a sealant is disposed, and FIG. 4C is a schematic plan view of FIG. 4B.

DESCRIPTION OF THE PREFERRED EMBODIMENTS

In the following, an embodiment of the present invention is described with reference to the drawings.

Separation Membrane Element

Figure 1:
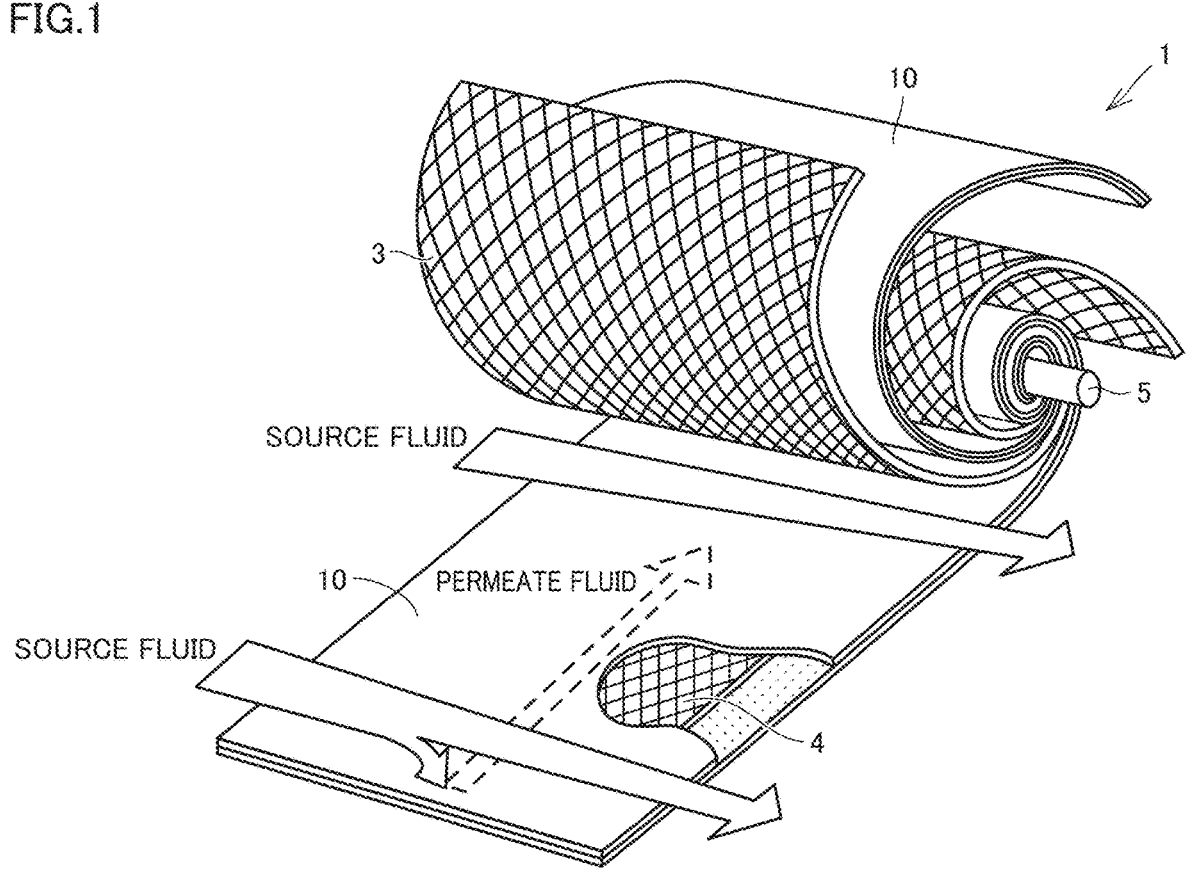
FIG. 1 is a developed and partially-cut-out schematic perspective view showing an example separation membrane element of the present invention.
Figure 2A:
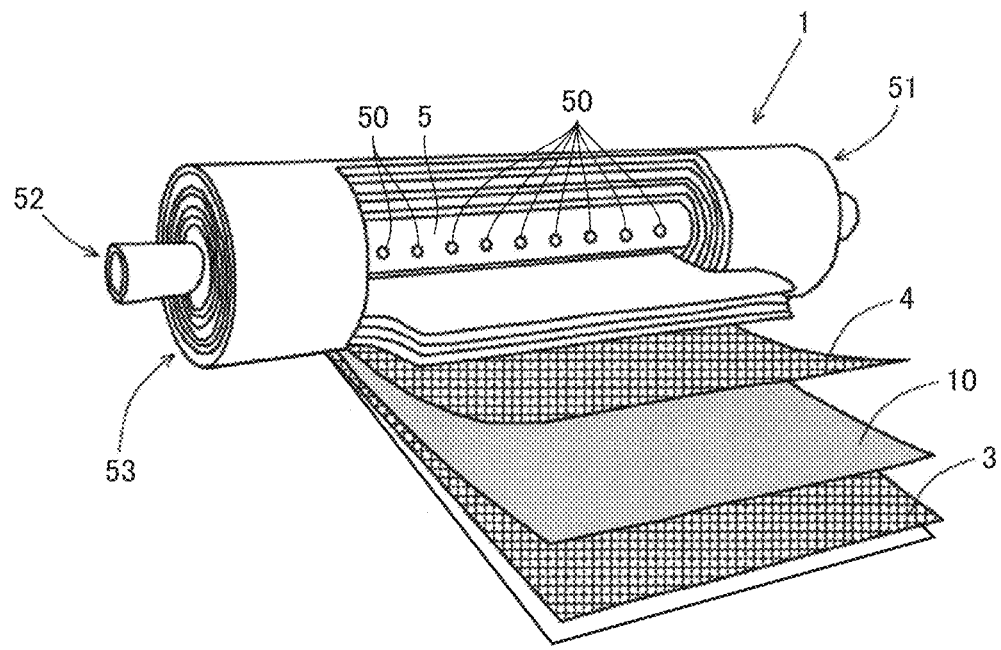
FIGS. 2A and 2B are each a partially-developed schematic perspective view showing an example separation membrane element of the present invention.
Figure 2B:
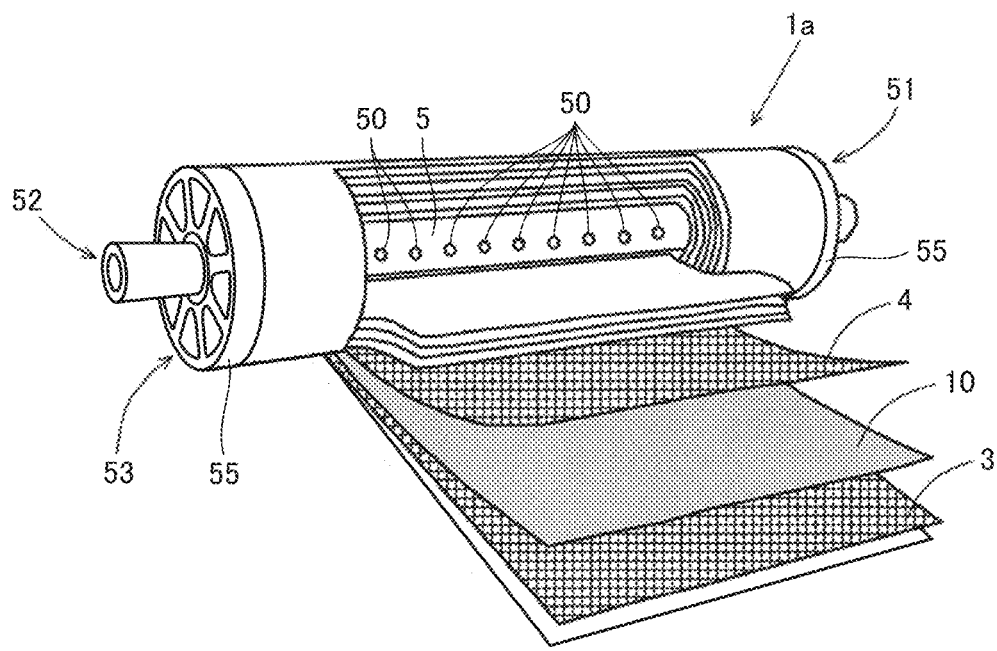
Figure 3A:
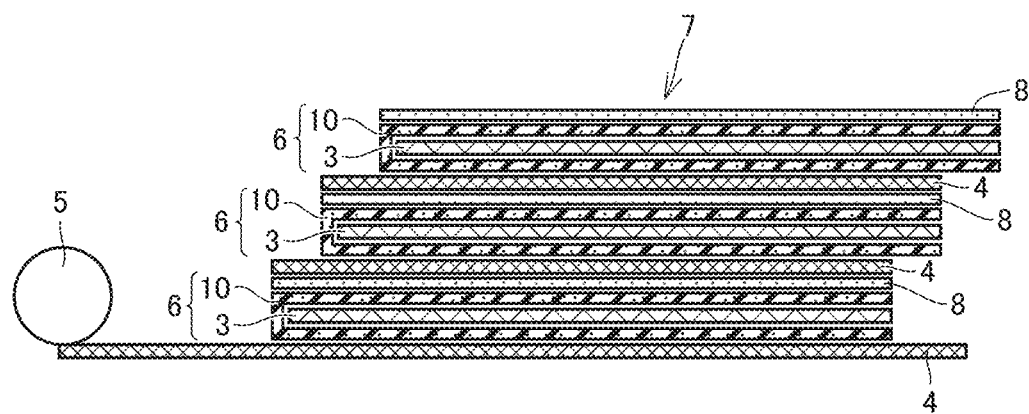
FIGS. 3A to 3C show an example wound body included in the separation membrane element of the present invention.
Figure 3B:
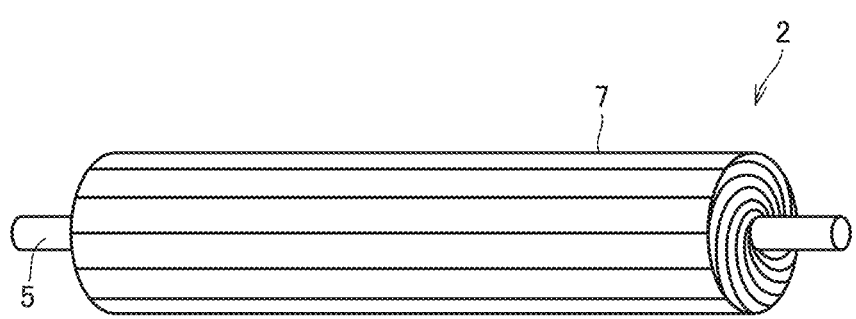
Figure 3C:
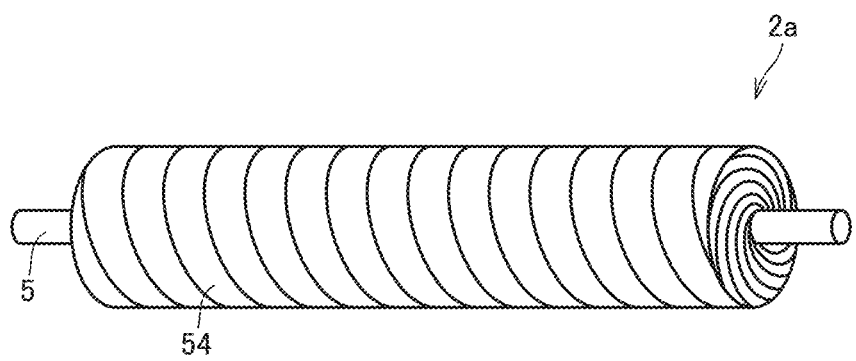

FIG. 1 is a developed and partially-cut-out schematic perspective view showing a separation membrane element of the present embodiment. FIGS. 2A and 2B are each a partially-developed schematic perspective view showing the separation membrane element of the present embodiment. FIGS. 3A to 3C show an example wound body included in the separation membrane element of the present embodiment, FIG. 3A is a developed schematic cross-sectional view of the wound body, FIG. 3B is a schematic view of the wound body, and FIG. 3C is a schematic view of the wound body with an outer sheath.

A spiral-wound type separation membrane element 1 of the present embodiment includes, as shown in FIG. 1:

a feed-side channel member 3 in which a source fluid flows;

a separation membrane sheet 10 (separation membrane) that causes a specific fluid included in the source fluid flowing in feed-side channel member 3 to be selectively separated and permeate the separation membrane sheet;

a permeate-side channel member 4 in which a permeate fluid that has permeated separation membrane sheet 10 flows;

a sealing part for preventing mixture of the source fluid and the permeate fluid; and a hollow tube 5 that is perforated for collecting the permeate fluid flowing in permeate-side channel member 4.

In separation membrane element 1, a laminated body 7 including separation membrane sheet 10 is wound around hollow tube 5. Separation membrane element 1 can be obtained by curing a sealant described later herein to form the sealing part in a wound body 2 (FIG. 3B) in which laminated body 7 is wound around hollow tube 5. Wound body 2 may have any shape such as cylinder, prism, or the like. As shown in FIG. 3A, laminated body 7 includes one or more separation membrane units 9 (FIG. 4A) that are each a stack of permeate-side channel member 4 and a membrane leaf 6 in which a feed-side channel member 3 is interposed between separation membrane sheets 10 arranged to face each other, and laminated body 7 also includes a sealant 8 disposed on at least one side of separation membrane unit 9 (FIGS. 4B and 4C). Sealant 8 included in laminated body 7 is provided to form the sealing part of separation membrane element 1. The sealing part of separation membrane element 1 is disposed between membrane leaves 6 that face each other with permeate-side channel member 4 interposed therebetween in separation membrane element 1. The sealing part may be formed by sealant 8 penetrating into permeate-side channel member 4. The sealing part may include a portion formed by the sealant penetrating in a part of the member which forms membrane leaf 6.

As shown in FIG. 3C, separation membrane element 1 may be separation membrane element 1 including an outer-sheathed wound body 2a formed by wrapping an outer sheath 54 such as outer peripheral tape around the outer periphery of laminated body 7 which forms wound body 2, for preventing wound body 2 from being rewound or collapsed in its winding. As shown in FIG. 2B, separation membrane element 1 may be a separation membrane element 1a including a fixing member such as anti-telescope plate 55 on each of the opposite sides (opposite ends of laminated body 7 which is wound) of outer-sheathed wound body 2a. Further, in order to ensure a strength against a load which is applied due to an internal pressure and an external pressure impressed on separation membrane element 1, an outer wrap (reinforcement layer) may be provided on the outermost periphery of outer-sheathed wound body 2a having wound outer sheath 54.

Separation membrane sheet 10 included in separation membrane element 1 may be a separation membrane sheet that can selectively cause fluid such as gas or liquid to permeate the separation membrane element, e.g., selectively cause acid gas as described later herein to permeate the separation membrane sheet, or may be a separation membrane sheet that selectively causes specific ions to permeate therethrough, for example. Therefore, in separation membrane element 1, as shown in FIGS. 2A and 2B, a source fluid is supplied from a feed-side end 51, and a permeate fluid that has permeated separation membrane sheet 10 is collected in hollow tube 5 and discharged from a discharge port 52 and/or a port located opposite to discharge port 52, while the source fluid that has not permeated separation membrane sheet 10 can be discharged from a discharge-side end 53.

Manufacturing Method for Separation Membrane Element

Figure 4A:
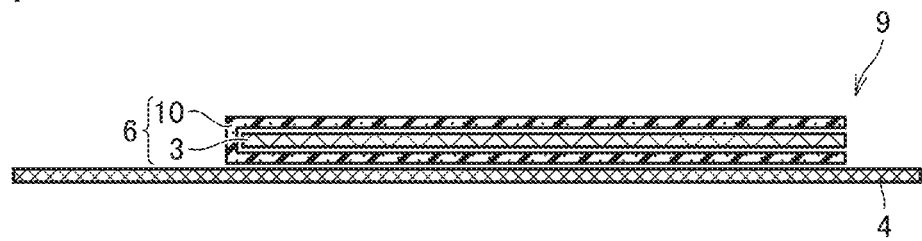
FIGS. 4A to 4C show an example step of manufacturing method for a separation membrane element of the present invention.
Figure 4B:
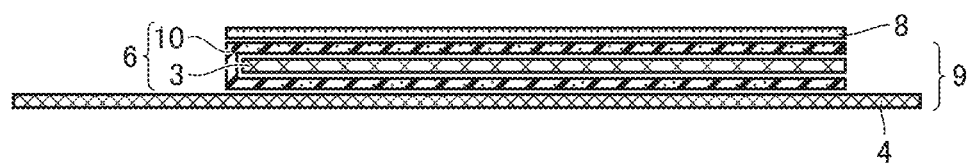
Figure 4C:
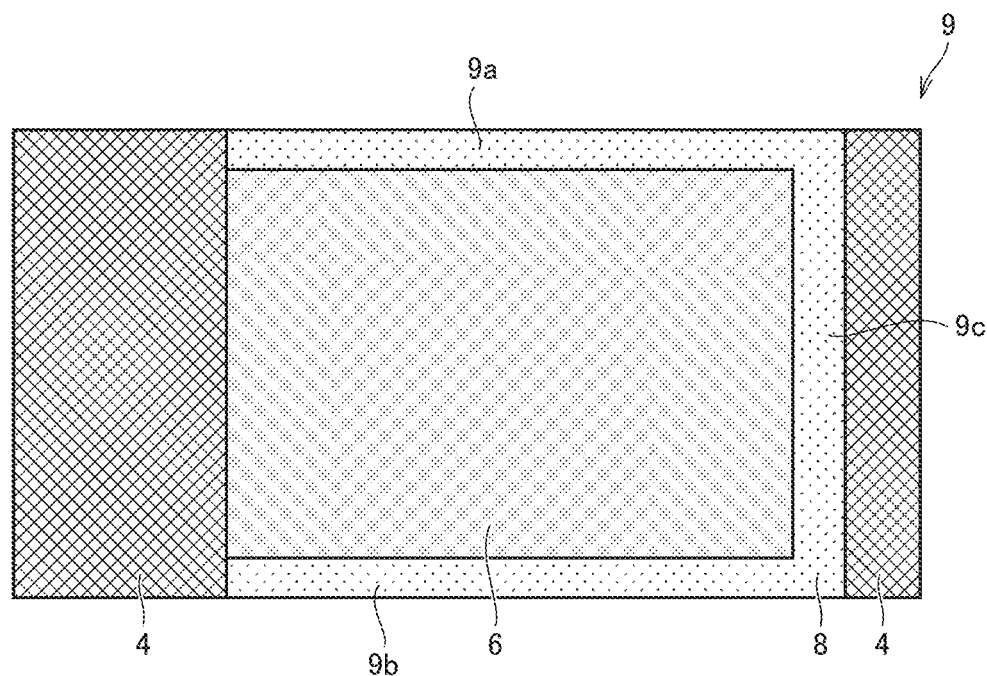
Figure 5A:
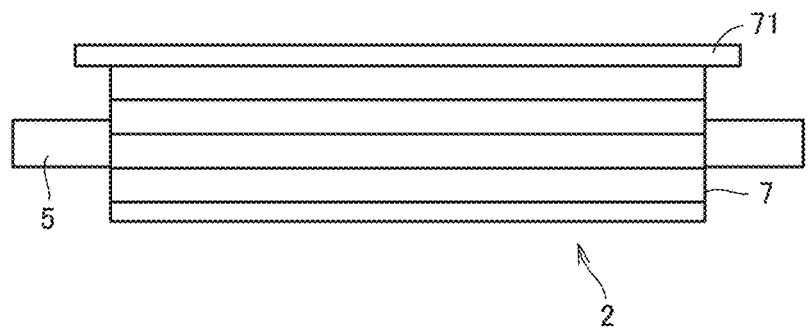
FIGS. 5A and 5B are each a schematic view showing an example step of manufacturing method for a separation membrane element of the present invention.
Figure 5B:
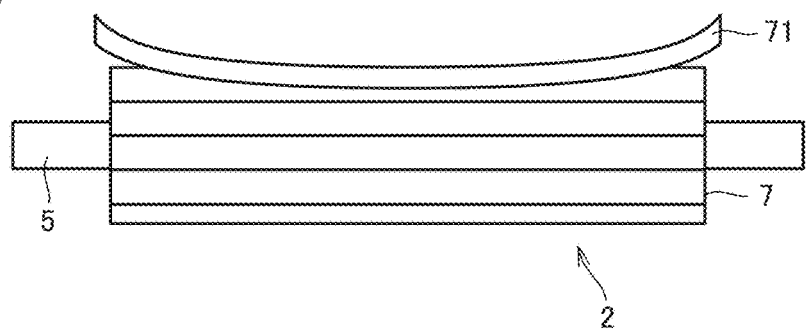
Figure 15A:
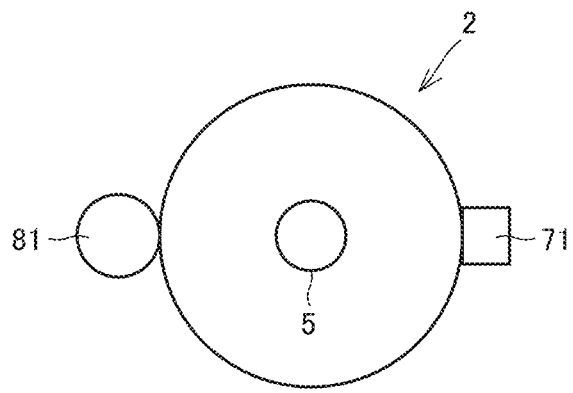
FIGS. 15A to 15C are each a schematic cross-sectional view showing a still further example step of manufacturing method for a separation membrane element of the present invention.
Figure 15B:
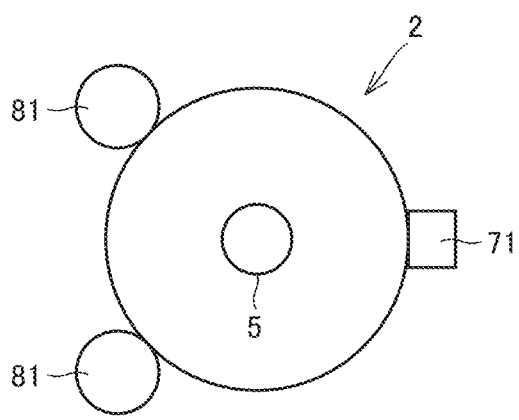
Figure 15C:
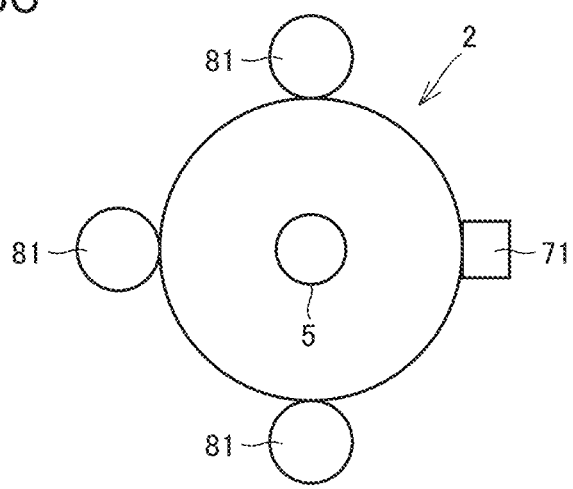

FIGS. 4A to 4C each show an example step of manufacturing method for a separation membrane element of the present embodiment, FIG. 4A is a schematic cross-sectional view of separation membrane unit 9, FIG. 4B is a schematic cross-sectional view of separation membrane unit 9 on which sealant 8 is disposed, and FIG. 4C is a schematic plan view of FIG. 4B. FIGS. 5A and 5B are each a schematic view showing an example step of manufacturing method for a separation membrane element of the present invention. FIGS. 6A to 12 are each a schematic view showing another example step of manufacturing method for a separation membrane element of the present invention. FIG. 13 is a schematic view shown for the sake of convenience for illustrating a pressure measurement region specified for measuring the pressing pressure in a step of manufacturing method for a separation membrane element of the present invention. FIGS. 15A to 15C are each a schematic cross-sectional view showing a still further example step of manufacturing method for a separation membrane element of the present invention.

A manufacturing method for separation membrane element 1 of the present embodiment includes the step of pressing a press bar 71 (press member) against a portion of laminated body 7, and this portion is a portion wound around hollow tube 5 (hereinafter this step may also be referred to as "step of pressing"). The step of pressing includes the step of pressing press bar 71 while rotating hollow tube 5. A rotational drive force may be applied to hollow tube 5 to rotate hollow tube 5, or a rotational drive force may be applied to the portion of laminated body 7 that is wound around hollow tube 5 to thereby rotate hollow tube 5. Hollow tube 5 may be rotated either continuously or intermittently. The step of pressing may include the step of pressing press bar 71 against the portion of laminated body 7 that is wound around hollow tube 5, without rotating hollow tube 5.

The step of pressing includes the step of forming, in laminated body 7 wound around hollow tube 5, a first-side sealant region, a second-side sealant region, and an end sealant region for forming the aforementioned sealing part. The first-side sealant region and the second-side sealant region are regions formed by sealant 8 applied to a first-side portion 9a and a second-side portion 9b (FIG. 4C) described later herein, respectively, of separation membrane unit 9 in laminated body 7 wound around hollow tube 5 (this laminated body 7 may be wound body 2 made up of laminated body 7), so that sealant 8 penetrates in permeate-side channel member 4 between membrane leaves 6, or is spread between membrane leaves 6 that are located to face each other (permeate-side channel member 4 may be interposed therebetween). An end sealant region in the portion of laminated body 7 wound around hollow tube 5 is a region formed by sealant 8 applied to an end portion 9c (FIG. 4C) described later herein, of separation membrane unit 9, so that sealant 8 penetrates in permeate-side channel member 4 between membrane leaves 6, or is pressed to spread between membrane leaves 6 facing each other (permeate-side channel member 4 may be interposed therebetween). The end sealant region herein refers to a region located between the first-side sealant region and the second-side sealant region, and does not include the first-side sealant region and the second-side sealant region. The first-side sealant region, the second-side sealant region, and the end sealant region are all regions formed in laminated body 7 wound around hollow tube 5 (this laminated body 7 may be wound body 2 made up of laminated body 7) at the time when the step of pressing is completed.

In the manufacturing method for separation membrane element 1, the step of pressing may include the step of fabricating wound body 2 in which laminated body 7 is wound around hollow tube 5. Laminated body 7 includes one or more separation membrane units 9 that are each a stack of membrane leaf 6 and permeate-side channel member 4, and also includes sealant 8 disposed on at least one side of separation membrane unit 9 (FIGS. 3A and 4B). Thus, the manufacturing method for separation membrane element 1 may include the step of fabricating membrane leaf 6 and the step of fabricating laminated body 7. Preferably, the manufacturing method for separation membrane element 1 includes the step of winding outer sheath 54 such as outer peripheral tape around wound body 2 to form outer-sheathed wound body 2a (FIG. 3C), and the step of curing sealant 8 of outer-sheathed wound body 2a.

The step of fabricating membrane leaf 6 may be performed by folding separation membrane sheet 10 into two leaves and holding feed-side channel member 3 between these two leaves of separation membrane sheet 10 as shown in the cross-sectional view in FIG. 4A, for example. While separation membrane sheet 10 may be folded into two leaves for use, two separation membrane sheets 10 may be arranged to face each other, feed-side channel member 3 may be interposed between these two sheets 10, and two separation membrane sheets 10 may be attached together along one side.

The step of fabricating laminated body 7 may include, for example, the step of stacking membrane leaf 6 and permeate-side channel member 4 together to fabricate separation membrane unit 9 as shown in FIG. 4A, and the step of disposing sealant 8 on at least one side of separation membrane unit 9 as shown in FIGS. 4B and 4C. In the step of fabricating separation membrane unit 9, membrane leaf 6 may be disposed on permeate-side channel member 4 as shown in FIG. 4A, for example. The step of disposing sealant 8 may dispose sealant 8 on first-side portion 9a, second-side portion 9b, and end portion 9c on a surface of the membrane leaf 6 side in separation membrane unit 9, as shown in FIGS. 4B and 4C, for example. First-side portion 9a and second-side portion 9b of separation membrane unit 9 are regions located along the opposite ends, in the axial direction, of wound body 2 and extending in the winding direction of laminated body. End portion 9c is a region located along the outer end of the ends extending in the axial direction of wound body 2. As shown in FIG. 4C, sealant 8 on first-side portion 9a and sealant 8 on second-side portion 9b may be located along the opposite ends in the axial direction of membrane leaf 6. Alternatively, they may spread further inward in the axial direction from the opposite ends in the axial direction and extend along the winding direction. Likewise, sealant 8 on end portion 9c may be located along one end extending in the axial direction of membrane leaf 6 as shown in FIG. 4C. Alternatively, it may spread further inward in the winding direction (direction orthogonal to the axial direction) from the one end and extend along the axial direction.

Sealant 8 may be disposed on separation membrane unit 9 by being transferred or applied to separation membrane unit 9, for example. In the forgoing, sealant 8 is described as being disposed on a surface of the membrane leaf 6 side in separation membrane unit 9. Alternatively, sealant 8 may be disposed on the surface of the permeate-side channel member 4 side in of separation membrane unit 9, or both surfaces (surfaces of the membrane leaf 6 side and the permeate-side channel member 4 side) in separation membrane unit 9. In order to promote penetration of sealant 8 in the member forming membrane leaf 6, it is preferable to dispose sealant 8 on both surfaces of permeate-side channel member 4 interposed between adjacent membrane leaves 6.

While the step of fabricating laminated body 7 may be only the aforementioned step, a series of the aforementioned steps may be repeated to stack a plurality of separation membrane units 9 together as shown in FIG. 3A. Alternatively, the step of fabricating laminated body 7 may be performed in the following way. First, sealant 8 is disposed on membrane leaf 6 or permeate-side channel member 4 as described above, and membrane leaf 6 and permeate-side channel member 4 are stacked together with sealant 8 interposed therebetween to thereby form a composite, and a plurality of such composites are prepared. Subsequently, on separation membrane unit 9 in which membrane leaf 6 is disposed on permeate-side channel member 4 (FIG. 4A), the prepared composites may be stacked so that permeate-side channel member 4 faces membrane leaf 6 of separation membrane unit 9, to thereby form laminated body 7 in which a plurality of separation membrane units 9 are stacked together.

The number of separation membrane units 9 that are stacked together may be selected depending on the separation ability, for example, of separation membrane element 1, and the number may be 10 or more, 20 or more, or 30 or more, for example, and is usually 70 or less. In laminated body 7 including a plurality of separation membrane units 9, preferably separation membrane units 9 are stacked together so that respective folds of membrane leaves 6 are located on the same side, and respective positions of the folds are displaced in the direction orthogonal to the folds.

Next, the step of forming wound body 2 is performed. In the step of forming wound body 2, one end of permeate-side channel member 4 forming the outermost layer of the resultant laminated body 7 is fixed to the outer periphery of hollow tube (FIG. 3A), and laminated body 7 is wound around hollow tube 5. Hollow tube 5 may be fixed in advance to permeate-side channel member 4 used for forming laminated body 7, or permeate-side channel member 4 to which hollow tube 5 is fixed may be used to form laminated body 7. As shown in FIG. 3A, hollow tube 5 is preferably located at the end where the fold of membrane leaf 6 in laminated body 7 is located. When laminated body 7 is wound around hollow tube 5, hollow tube 5 may be rotated to allow laminated body 7 to be wound around hollow tube 5, and thereby obtain wound body 2 as shown in FIG. 3B.

As described above, the manufacturing method for separation membrane element 1 includes the step of pressing press bar 71 against a portion of laminated body 7 that is wound around hollow tube 5, and the step of pressing includes the step of pressing press bar 71 while rotating hollow tube 5 (FIGS. 5A and 5B). Press bar 71 may be a plate-shaped member or a rod-shaped member of high-strength resin, metal such as stainless steel, or the like, for example, and may extend in the axial direction of hollow tube 5. For example, press bar 71 may extend in parallel with the axial direction. The plate-shaped member and the rod-shaped member may at least have a shape that can be curved toward laminated body 7 that is wound around hollow tube 5, as described later herein. The cross-sectional shape of the plate-shaped member and the rod-shaped member is not particularly limited, and may be any of circle, ellipse, oval, polygon such as triangle or rectangle, a shape including a curved portion and a straight portion, and the like. Press bar 71 preferably has a length that allows press bar 71 to be pressed against the whole axial length of wound body 2, and is preferably longer than the whole axial length of wound body 2.

Moreover, preferably the surface of press bar 71 that is to be brought into contact with the surface of laminated body 7 has been subjected to a surface treatment such as polishing for reducing friction, so as not to damage laminated body 7 due to friction generated between press bar 71 and laminated body 7 when press bar 71 is pressed against laminated body 7 while hollow tube 5 is rotated. The degree to which the surface of press bar 71 to be brought into contact with the surface of laminated body 7 is treated is not particularly limited, and the treated surface of press bar 71 may have an arithmetic mean roughness Ra of preferably 25 or less, and more preferably 20 or less, for example.

In the step of pressing, a pressing pressure is applied by press bar 71 to sealant 8 included in laminated body 7, so that sealant 8 spreads between membrane leaves 6 that face each other with permeate-side channel member 4 interposed therebetween in the portion of laminated body 7 that is wound around hollow tube 5, and so that sealant 8 penetrates in permeate-side channel member 4, or in a part of the members forming membrane leaves 6 as required. Such spread and penetration of sealant 8 cause sealant 8 applied to first-side portion 9a and second-side portion 9b to form a first-side sealant region and a second-side sealant region, respectively, in wound body 2, and also cause sealant 8 applied to end portion 9c to form an end sealant region in laminated body 7 wound around hollow tube 5. Sealant 8 in the first-side sealant region, the second-side sealant region, and the end sealant region that are included in wound body 2 made up of laminated body 7 and hollow tube 5 around which laminated body 7 is wound is then cured as described later herein. Accordingly, separation membrane element 1 can be obtained that has a sealing part, between membrane leaves 6 facing each other with permeate-side channel member 4 interposed therebetween, for preventing mixture of the source fluid and the permeate fluid.

As described above, in the step of pressing, a pressing pressure is applied to sealant 8 disposed on first-side portion 9a, second-side portion 9b, and end portion 9c of separation membrane unit 9, to thereby form the first-side sealant region, the second-side sealant region, and the end sealant region for forming the sealing part in the portion of laminated body 7 that is wound around hollow tube 5 (this laminated body 7 may be wound body 2 made up of laminated body 7). Therefore, the method preferably includes the step of pressing press bar 71 so that a pressing pressure of 10 kPa or more is applied to at least a part of each of the region that is to form the first-side sealant region, the region that is to form the second-side sealant region, and the region that is to form the end sealant region in laminated body 7 wound around hollow tube 5 (this laminated body 7 may be wound body 2 made up of laminated body 7). The step of pressing press bar 71 may be performed to apply the pressing pressure simultaneously to the above-identified three regions (the region that is to form the first-side sealant region, the region that is to form the second-side sealant region, and the region that is to form the end sealant region), or apply the pressing pressure to respective regions in separate steps. When the step of pressing is performed by means of press bar 71, the step of applying the pressing pressure to the region that is to form the first-side sealant region and the region that is to form the second-side sealant region and the step of applying the pressing pressure to the region that is to form the end sealant region may be performed separately, as described later herein.

The step of pressing may be performed in the step of winding laminated body 7 around hollow tube 5 (in the step of forming wound body 2), may be performed on wound body 2 obtained by winding laminated body 7 around hollow tube 5 or may be performed on outer-sheathed wound body 2a in which outer sheath 54 is wound around the outer periphery of wound body 2, or may be a combination of any of them. The step of pressing may be performed in the following way, for example. In winding laminated body 7 around hollow tube 5, press bar 71 is pressed against the portion of laminated body 7 that is wound around hollow tube 5 while hollow tube 5 is rotated. In this state, the whole length of laminated body 7 is wound around hollow tube 5 to form wound body 2 (FIG. 3B). After wound body 2 is formed, hollow tube 5 is still rotated to rotate the wound body, and press bar 71 is pressed against this rotating wound body 2. Preferably, the step of pressing is performed in at least a part of the period for the step of winding laminated body 7 around hollow tube 5 while rotating hollow tube 5, and performed on wound body 2 obtained by winding laminated body 7 of the whole length around hollow tube 5 while rotating hollow tube 5.

In the step of pressing, press bar 71 is pressed against laminated body 7 wound around hollow tube 5 to satisfy respective relations defined by formulas (1) and (2):

$$0.1 \times Ps1 \leq Pe \qquad (1), \text{ and}$$

$$0.1 \times Ps2 \leq Pe \qquad (2).$$

Ps1 and Ps2 may be the same value or different values.

In the above formulas (1) and (2), Ps1, Ps2, and Pe have the following meanings. Specifically, supposing that laminated body 7 wound around hollow tube 5 at a time when the step of pressing is completed has a first-side sealant region where sealant 8 disposed on first-side portion 9a of separation membrane unit 9 is located, a second-side sealant region where the sealant disposed on second-side portion 9b of separation membrane unit 9 is located, and an end sealant region where the sealant disposed on end portion 9c is located, wherein the end sealant region is located to extend between the first-side sealant region and the second-side sealant region, and that a plurality of pressure measurement regions are defined successively along an entire length in the axial direction of laminated body 7 wound around hollow tube 5, Ps1 is a maximum value of respective time-average pressing pressures in pressure measurement regions constituting a first-side pressure measurement region, the pressure measurement regions are a part of the plurality of pressure measurement regions and include at least a part of the first-side sealant region, the time-average pressing pressure in each pressure measurement region is a time average of a pressing pressure of 10 kPa or more applied to the pressure measurement region, for a time period for which the pressing pressure of 10 kPa or more is applied to the first-side pressure measurement region, Ps2 is a maximum value of respective time-average pressing pressures in pressure measurement regions constituting a second-side pressure measurement region, the pressure measurement regions are a part of the plurality of pressure measurement regions and include at least a part of the second-side sealant region, the time-average pressing pressure in each pressure measurement region is a time average of a pressing pressure of 10 kPa or more applied to the pressure measurement region, for a time period for which the pressing pressure of 10 kPa or more is applied to the second-side pressure measurement region, and Pe is a maximum value of respective time-average pressing pressures in pressure measurement regions constituting an end pressure measurement region, the pressure measurement regions are a part of the plurality of pressure measurement regions and located between the first-side pressure measurement region and the second-side pressure measurement region, the time-average pressing pressure in each pressure measurement region is a time average of a pressing pressure of 10 kPa or more applied to the pressure measurement region, for a time period for which the pressing pressure of 10 kPa or more is applied to the end pressure measurement region.

The aforementioned pressure measurement regions are a plurality of regions defined successively along the whole axial length of laminated body 7 wound around hollow tube 5 (this laminated body 7 may be wound body 2 made up of laminated body 7), and the regions each have a columnar shape defined to have a predetermined length in the axial direction of laminated body 7 wound around hollow tube 5. Pressure measurement regions 31 are defined to enable measurement of a change, with time, of the pressing pressure applied to the surface of laminated body 7 wound around hollow tube 5 in the step of pressing, for each pressure measurement region 31. As described later in connection with Examples, pressure measurement regions 31 may be defined by a surface pressure distribution measurement system (I-scan system manufactured by NITTA Corporation), and more specifically may be defined by the area of a sensor of the surface pressure distribution measurement system.

The first-side pressure measurement region is the region that is indicated by reference character "32a" in FIG. 13 and constituted of pressure measurement regions 31 of a plurality of pressure measurement regions 31, and that includes at least a part of the first-side sealant region at the time when the step of pressing is ended. The second-side pressure measurement region is the region indicated by reference character "32b" in FIG. 13 and constituted of pressure measurement regions 31 of the plurality of pressure measurement regions 31, and that includes at least a part of the second-side sealant region at the time when the step of pressing is ended. The end pressure measurement region is the region that is indicated by reference character "33" in FIG. 13 and constituted by pressure measurement regions 31 located between first-side pressure measurement region 32*a* and second-side pressure measurement region 32*b* at the time when the step of pressing is ended. End pressure measurement region 33 does not include first-side pressure measurement region 32*a* and second-side pressure measurement region 32*b*.

Ps1 in the above formula (1) is determined through the following procedure. First, the time-average pressing pressure for each pressure measurement region 31 included in first-side pressure measurement region 32*a* is calculated as a time average of a pressing pressure of 10 kPa or more applied to this pressure measurement region 31 for a time period for which a pressing pressure of 10 kPa or more is applied to first-side pressure measurement region 32*a*. Next, the maximum value, Ps1, of respective time-average pressing pressures calculated for respective pressure measurement regions 31 is determined. Here, the time period for which a pressing pressure of 10 kPa or more is applied to first-side pressure measurement region 32*a* is the total time period for which a pressing pressure of 10 kPa or more is applied to any of pressure measurement regions 31 included in first-side pressure measurement region 32*a*. The time-average pressing pressure for each pressure measurement region 31 included in first-side pressure measurement region 32*a* is the time average of the total pressing pressure (the value of the integral in a graph plotting the pressing pressure with respect to time) applied for the time period for which a pressing pressure of 10 kPa or more is applied to first-side pressure measurement region 32*a*, for the total time period for which a pressing pressure of 10 kPa or more is applied to first-side pressure measurement region 32*a*.

Ps2 in the above formula (2) may also be determined through a similar procedure. Specifically, first, the time-average pressing pressure for each pressure measurement region 31 included in second-side pressure measurement region 32*b* is calculated as a time average of a pressing pressure of 10 kPa or more applied to this pressure measurement region 31 for a time period for which a pressing pressure of 10 kPa or more is applied to second-side pressure measurement region 32*b*. Next, the maximum value, Ps2, of respective time-average pressing pressures calculated for respective pressure measurement regions 31 is determined. As with Ps1 described above, the time period for which a pressing pressure of 10 kPa or more is applied to second-side pressure measurement region 32*b* is the total time period for which a pressing pressure of 10 kPa or more is applied to any of pressure measurement regions 31 included in second-side pressure measurement region 32*b*. As also with Ps1, the time-average pressing pressure for each pressure measurement region 31 included in second-side pressure measurement region 32*b* is the time average of the total pressing pressure (the value of the integral in a graph plotting the pressing pressure with respect to time) applied for the time period for which a pressing pressure of 10 kPa or more is applied to second-side pressure measurement region 32*b*, for the total time period for which a pressing pressure of 10 kPa or more is applied to second-side pressure measurement region 32*b*.

Pe included in the above formulas (1) and (2) is also determined similarly. Specifically, first, the time-average pressing pressure for each pressure measurement region 31 included in end pressure measurement region 33 is calculated as a time average of a pressing pressure of 10 kPa or more applied to this pressure measurement region 31 for a time period for which a pressing pressure of 10 kPa or more is applied to end pressure measurement region 33. Next, the maximum value, Pe, of respective time-average pressing pressures calculated for respective pressure measurement regions 31 is determined. The time period for which a pressing pressure of 10 kPa or more is applied to end pressure measurement region 33 is the total time period for which a pressing pressure of 10 kPa or more is applied to any of pressure measurement regions 31 included in end pressure measurement region 33. The time-average pressing pressure is the time average of the total pressing pressure (the value of the integral in a graph plotting the pressing pressure with respect to time) applied for the time period for which a pressing pressure of 10 kPa or more is applied to end pressure measurement region 33, for the total time period for which a pressing pressure of 10 kPa or more is applied to end pressure measurement region 33.

Preferably, the step of pressing includes pressing press bar 71 to further satisfy respective relations defined by formulas (3) and (4):

$$1.1 \times Ps1 \geq Pe \qquad (3), \text{ and}$$

$$1.1 \times Ps2 \geq Pe \qquad (4).$$

The fact that Pe is more than or equal to Ps1 times 0.1 and more than or equal to Ps2 times 0.1 allows the sealant applied to the end portion to easily spread and easily penetrate in permeate-side channel member 4 or a part of the members forming membrane leaf 6 as required, which enables improvement of the adhesion area formed by the sealant. Thus, formation of the sealing part with improved reliability in terms of sealing property, for example, is facilitated. Pe is preferably more than or equal to Ps1 times 0.3 and more than or equal to Ps2 times 0.3, more preferably more than or equal to Ps1 times 0.5 and more than or equal to Ps2 times 0.5, and still more preferably more than or equal to Ps1 times 0.7 and more than or equal to Ps2 times 0.7. Moreover, Pe is preferably less than or equal to Ps1 times 1.1 and less than or equal to Ps2 times 1.1, and more preferably less than or equal to Ps1 times 1.0 and less than or equal to Ps2 times 1.0. The fact that Pe is more than Ps1 times 1.1 and more than Ps2 times 1.1 makes it more likely that a resin layer in a gel form, particularly if included in separation membrane sheet 10, is crushed.

In the manufacturing method for a separation membrane element of the present embodiment, the step of pressing includes the step of pressing press bar 71 against laminated body 7 wound around hollow tube 5 to satisfy respective relations defined by the above formulas (1) to (4), as described above. The step of pressing preferably presses press bar 71 to satisfy respective relations defined by the above formulas (1) to (4) in the period in which press bar 71 is pressed against laminated body 7 wound around hollow tube 5 while hollow tube 5 is rotated. Accordingly, sealant 8 on first-side portion 9*a* and second-side portion 9*b* as well as sealant 8 on end portion 9*c* spread and/or penetrate properly, to enable increase of the adhesion area formed by the sealant. Thus, the sealant can be located over the range to be sealed by the sealant, which enables improvement of the reliability of the sealing part formed by the sealant. Thus, the sealing part can be expected to be formed that can properly prevent mixture of the source fluid and the permeate fluid in separation membrane element 1.

The step of pressing performed to satisfy respective relations defined by the above formulas (1) and (2) may include: the step, as shown in FIG. 5A, of pressing press bar 71 held in parallel with the axial direction, against laminated body 7 wound around hollow tube 5 or against wound body 2, while rotating hollow tube 5 (the step may also be referred to as "Step A" hereinafter); and the step, as shown in FIG. 5B, of pressing press bar 71 curved toward laminated body 7 wound around hollow tube 5 or toward wound body 2, against laminated body 7 wound around hollow tube 5 or against wound body 2, while rotating hollow tube 5 (the step may also be referred to as "Step B" hereinafter). For example, Step A may be performed for the purpose of applying a pressing pressure mainly to the region that is to form the aforementioned first-side sealant region, and to the region that is to form the aforementioned second-side sealant region, and Step B may be performed for the purpose of applying a pressing pressure mainly to the region that is to form the aforementioned end sealant region. While FIGS. 5A and 5B each show the case where press bar 71 is pressed against wound body 2, the manner shown in FIGS. 5A and 5B may be applied as well to the case where press bar 71 is pressed against laminated body 7 wound around hollow tube 5 and the case where press bar 71 is pressed against outer-sheathed wound body 2a (FIG. 3C).

In laminated body 7, sealant 8 is disposed on first-side portion 9a, second-side portion 9b, and end portion 9c of separation membrane unit 9 as described above (FIGS. 4B and 4C). Therefore, when laminated body 7 is wound around hollow tube 5, each of sealant 8 disposed on first-side portion 9a and sealant 8 disposed on second-side portion 9b of separation membrane unit 9, which are located on the opposite ends in the axial direction of wound body 2, overlaps in the radial direction, so that, in radial cross sections of wound body 2, sealant 8 in the opposite ends is denser than sealant 8 in the axially central portion of wound body 2. In contrast, in the axially central portion of wound body 2, sealant 8 disposed on end portion 9c of separation membrane unit 9 is present intermittently in the circumferential direction of wound body 2 and there is less overlapping of sealant 8 in the radial direction. Therefore, in radial cross sections of wound body 2, sealant 8 in the axially central portion is sparser than sealant 8 in the opposite ends in the axial direction of wound body 2. Such wound body 2 tends to be harder in the axially opposite ends and softer in the axially central portion.

Thus, when Step A is performed as shown in FIG. 5A with press bar 71 held in parallel with the axial direction of laminated body 7 wound around hollow tube 5 or wound body 2, it is relatively easy to apply the pressing pressure by press bar 71 to sealant 8 disposed on first-side portion 9a and second-side portion 9b, while it is relatively hard to apply the pressing pressure by press bar 71 to sealant 8 disposed on end portion 9c. In view of this, as shown in FIG. 5B, press bar 71 curved toward laminated body 7 wound around hollow tube 5 or toward wound body 2 is pressed against laminated body 7 wound around hollow tube 5 or against wound body 2 (Step B), to thereby enable press bar 71 to apply a stronger pressing pressure also to sealant 8 disposed on end portion 9c, as compared with the pressing pressure applied in Step A (FIG. 5A). Thus, Steps A and B can be performed to cause sealant 8 disposed on first-side portion 9a, second-side portion 9b, and end portion 9c to spread and to penetrate in permeate-side channel member 4 or a part of the members forming membrane leaf 6 as required, and thereby increase the adhesion area formed by the sealant. Accordingly, the sealant can be extended over a range to be sealed by the sealant, to thereby improve the reliability of the sealing part formed by the sealant. Therefore, a sealing part excellent in sealing property can be expected to be formed in separation membrane element 1.

Press bar 71 may be pressed against laminated body 7 wound around hollow tube 5 or against wound body 2 by means of air pressure, hydraulic pressure, or the like. The magnitude of the air pressure, hydraulic pressure, or the like may be adjusted, and/or the region against which press bar 71 is pressed hard by means of air pressure, hydraulic pressure, or the like may be adjusted to thereby vary the pressing pressure applied by press bar 71, or the degree of deformation (the degree of curve) of press bar 71 may be adjusted to thereby adjust the pressing pressure applied to the sealant disposed on first-side portion 9a and second-side portion 9b, and/or end portion 9c, as shown in FIGS. 5A and 5B.

While the order in which Step A and Step B are performed is not particularly limited, the sealant disposed on first-side portion 9a and second-side portion 9b may initially be caused to spread and/or penetrate, to facilitate efficient spread and/or penetration of sealant 8 disposed on end portion 9c. In Step B, as compared with Step A, it tends to be relatively hard to cause sealant 8 disposed on first-side portion 9a and second-side portion 9b to spread and penetrate. Therefore, preferably Step A and Step B are performed in this order. While Steps A and B may each be performed once, Steps A and B may each be repeated two or more times. In the case where Step A and Step B are performed multiple times as well, preferably Step A is performed prior to Step B so that sealant 8 disposed on first-side portion 9a and second-side portion 9b are initially caused to spread and penetrate.

In the step of pressing, the way to press the press bar 71 is not particularly limited, as long as press bar 71 can be pressed against laminated body 7 wound around hollow tube 5 so that respective relations defined by the above formulas (1) and (2) are satisfied in the period in which press bar 71 is pressed against the portion of laminated body 7 that is wound around hollow tube 5 (this laminated body 7 may be wound body 2 made up of laminated body 7). As described above, in the step of pressing, Steps A and B may each be performed at least once, Steps A and B may be performed successively, and/or a rotation stoppage step of temporarily stopping the step of rotating hollow tube 5 may be provided between Steps A and B.

The pressing pressure applied for pressing press bar 71 against laminated body 7 wound around hollow tube 5, and the time for which the pressing pressure is applied may be set appropriately, depending on the number of stacked layers in separation membrane unit 9 in laminated body 7, and/or the degree to which sealant 8 is to be caused to spread and/or penetrate. For example, in Step A as shown in FIG. 5A of pressing press bar 71, the pressing pressure applied to the region that is to form the first-side sealant region and the region that is to form the second-side sealant region may be set to 10 kPa or more and 400 kPa or less, and the time for which the pressing pressure is applied may be set to 3 seconds or more and 900 seconds or less. In Step A, the pressing pressure applied to the region that is to form the end sealant region may be set to 0 kPa or more and 100 kPa or less, and the time for which the pressing pressure is applied may be set to 0 second or more and 900 seconds or less. In Step B as shown in FIG. 5B of pressing curved press bar 71, the pressing pressure applied to the region that is to form the end sealant region may be set to 10 kPa or more and 440 kPa or less, and the time for which the pressing pressure is applied may be set to 3 seconds or more and 600 seconds or less. In Step B, the pressing pressure applied to the region that is to form the first-side sealant region and the region that is to form the second-side sealant region may be set to 0 kPa or more and 400 kPa or less, and the time for which the pressing pressure is applied may be set to 5 seconds or more and 900 seconds or less.

The time for which Step A is performed may be identical to the time for which Step B is performed, the time for which Step A is performed may be shorter than the time for which Step B is performed, or the time for which Step A is performed may be longer than the time for which Step B is performed. Moreover, Step A may be performed for example before laminated body 7 has been wound around hollow tube 5 to form the wound body with the rotational speed set to 2 rpm or more and 50 rpm or less, and the time for which Step A is performed may be set to 3 seconds or more and 400 seconds or less, for example. Step B may be performed with the rotational speed set to 2 rpm or more and 50 rpm or less, for example, and the time for which Step B is performed may be set to 3 seconds or more and 400 seconds or less, for example.

In the manufacturing method for separation membrane element 1, when laminated body 7 is to be wound around hollow tube 5, press bar 71 may guide laminated body 7 so as to be wound around hollow tube 5. At the beginning of winding laminated body 7 around hollow tube 5, preferably press bar 71 held in parallel with the axial direction of hollow tube 5 (the state shown in FIG. 5A) is pressed against laminated body 7, so that the laminated body 7 is wound in a proper shape by preventing lateral displacement, for example, of wound laminated body 7. Moreover, while laminated body 7 is wound around hollow tube 5, the sealant may be caused to spread and/or penetrate as described above.

Thus, in the step of pressing, Step A may be a step from the start of winding laminated body 7 around hollow tube 5 to the completion of winding the whole length of laminated body 7. After wound body 2 is obtained, this wound body 2 may further be rotated to perform Step B. Step B may be performed, for example, for a period in which wound body 2 makes one or more rotation, preferably three or more rotations, or five or more rotations.

In the step of pressing, a guide member may be used for guiding pressing against laminated body 7 wound around hollow tube 5 (this laminated body 7 may be wound body 2 made up of laminated body 7), to the extent that does not affect Ps1, Ps2, and Pe in the above formulas (1) to (4) (i.e., for pressing with a pressing pressure of less than 10 kPa). One guide member, or two or more guide members may be arranged in the circumferential direction of laminated body 7 wound around hollow tube 5.

For example, when one guide member is arranged, the guide member may be arranged at the position of 180° with respect to the position of 0° at which press bar 71 is located, in the circumferential direction of wound body 2. When two guide members are arranged, the two guide members may be arranged at respective positions of 120° and 240°, for example, with respect to the position of 0° at which press bar 71 is located, in the circumferential direction of wound body 2. When three guide members are arranged, the three guide members may be arranged at respective positions of 90°, 180°, and 270°, for example, with respect to the position of 0° at which press bar 71 is located, in the circumferential direction of wound body 2. Thus, preferably press bar 71 and one guide member or two or more guide members are arranged at regular intervals in the circumferential direction of wound body 2. Moreover, when the step of pressing is performed by means of press bar 71 as well as the guide member(s) with the axial direction of hollow tube 5 oriented in the horizontal direction, preferably a press bar 71 is disposed so that at least a part of press bar 71 is located higher than the horizontal plane including the central axis of hollow tube 5.

The guide member is not particularly limited, as long as the guide member can guide the portion of laminated body 7 that is wound around hollow tube 5 (this laminated body 7 may be wound body 2 made up of laminated body 7). As the guide member, for example, a plate-shaped member or a rod-shaped member of resin or metal such as stainless steel, a plate-shaped or rod-shaped elastic body, roll, or the like, may be used. The guide member may guide the whole axial length, or a part, of the portion of laminated body 7 that is wound around hollow tube 5. When the guide member is configured to guide a part of the whole axial length of the portion of laminated body 7 that is wound around hollow tube 5, a plurality of guide members may be arranged in series along the axial direction of the portion of laminated body 7 that is wound around hollow tube 5.

In the step of pressing, a reinforcement member may be inserted in hollow tube 5 for suppressing flexure of hollow tube 5. The reinforcement member is preferably inserted in hollow tube 5, when the amount of flexure of hollow tube 5 caused by pressing of the press member such as press bar 71 against the portion of laminated body 7 wound around hollow tube 5 is large. The reinforcement member may be a cylindrical rod member of metal or the like having a diameter that allows the member to be inserted in hollow tube 5.

The manufacturing method for separation membrane element 1 may further include the step of winding outer sheath 54 around wound body 2 to form outer-sheathed wound body 2a. Outer sheath 54 may be a tape having a width smaller than the axial length of laminated body 7 in wound body 2, or a sheet having a width equal to the axial length of laminated body 7 in wound body 2. When the tape-shaped outer sheath is used, as shown in FIG. 3C, the tape-shaped outer sheath may be wound in a spiral manner around the outer surface of laminated body 7 in wound body 2. When the sheet-shaped outer sheath is used, the sheet-shaped outer sheath may be wound to cover the outer surface of laminated body 7 in wound body 2.

In the step of forming outer-sheathed wound body 2a, preferably a relation defined by a formula (5):

$$0.8 \times Ds \leq Dc \leq Ds \tag{5}$$

is satisfied, where Ds and Dc are each a diameter of outer-sheathed wound body 2a, Ds is a diameter taken at opposite ends in the axial direction of laminated body 7, and Dc is a diameter taken at a center in the axial direction.

If diameter Dc is less than Ds times 0.8, or diameter Dc is larger than diameter Ds, the diameter of outer-sheathed wound body 2a varies to a large extent in the axial direction, which is likely to cause wrinkles of outer-sheathed wound body 2a. Diameter Dc is preferably more than or equal to 0.85 times diameter Ds, more preferably more than or equal to 0.9 times diameter Ds, still more preferably more than or equal to 0.95 times diameter Ds, and most preferably equal to diameter Ds.

Diameter Ds is calculated in the following way, supposing that a cross section of outer-sheathed wound body 2a is in the shape of a perfect circle. In the first-side sealant region of outer-sheathed wound body 2a, the length of the circumference is measured at intervals of 5 mm from the end in the axial direction of the wound body, and the maximum value of respective measured lengths of the circumference is determined as the diameter. Likewise, in the second-side sealant region of outer-sheathed wound body 2a, the maximum value of respective lengths of the circumference that are measured at intervals of 5 mm from the end in the axial direction is determined as the diameter. Diameter Ds is herein an average value of the two diameters determined in the above-described manner.

Diameter Dc is herein a diameter calculated in the following way, supposing that a cross section of outer-sheathed wound body 2a is in the shape of a perfect circle. Specifically, in the end sealant region of the outer-sheathed wound body, the length of the circumference is measured at intervals of 5 mm from one end in the axial direction of the end sealant region, and the minimum value of respective measured lengths of the circumference is determined as diameter Dc.

In the manufacturing method for separation membrane element 1 of the present embodiment, the step of pressing presses press bar 71 against laminated body 7 wound around hollow tube 5 to satisfy respective relations defined by the above formulas (1) and (2). The step of pressing enables sealant 8 to penetrate in permeate-side channel member 4 between membrane leaves 6 and to spread between membrane leaves 6 that face each other (permeate-side channel member 4 may be interposed therebetween). It is therefore unnecessary to wind outer sheath 54 around the outer periphery of wound body 2 with a high tension of outer sheath 54 so that sealant 8 can spread and/or penetrate. Thus, outer sheath 54 can be wound around wound body 2 with a low tension. Accordingly, as implied by the above formula (5), variation, in the axial direction, of the diameter of outer-sheathed wound body 2a can be suppressed, and wrinkles of outer-sheathed wound body 2a can also be suppressed.

Further, the manufacturing method for separation membrane element 1 preferably includes the step of curing sealant 8 of outer-sheathed wound body 2a. Sealant 8 can be cured to form the sealing part of separation membrane element 1. In the manufacturing method for separation membrane element 1 of the present embodiment, the step of pressing causes sealant 8 in the side sealant regions and the end sealant region of wound body 2 to spread, and also penetrate in permeate-side channel member 4 and/or in a part of the members forming membrane leaf 6 as required. In this state, sealant 8 is cured. Thus, a highly reliable sealing part can be expected to be formed between membrane leaves 6 that face each other with permeate-side channel member 4 interposed therebetween, to properly suppress mixture of the source fluid and the permeate fluid.

A curing method for sealant 8 in the step of curing sealant 8 may be selected appropriately depending on the type of sealant 8. For example, for a thermosetting resin used as sealant 8, the thermosetting resin may be cured by heating, for example. For a thermal bonding adhesive used as sealant 8, it may be cooled after being heated, for example. For an active energy-ray curable resin used as sealant 8, it may be cured by application of active energy ray. For a material containing water or solvent used as sealant 8, it may be dried for removing the water or solvent.

Modifications

In the foregoing description regarding FIGS. 5A and 5B, the step of pressing is performed by means of press bar 71 as a press member. The step of pressing, however, is not limited to this, as long as the step of pressing can be performed to satisfy respective relations defined by the above formulas (1) and (2). For example, while the step of pressing is performed with a single press bar 71 according to the foregoing description, a plurality of press bars may be arranged in the winding direction (circumferential direction of wound body 2). The arrangement of a plurality of press bars is not particularly limited, and the press bars may be arranged at regular intervals, for example. Specifically, if three press bars are arranged of which a first press bar (press member) is arranged at the position of 0° (360°) in the circumferential direction of wound body 2, a second press bar (press member) may be arranged at the position of 120° and a third press bar (press member) may be arranged at the position of 240°.

Instead of a plurality of press bars, press bar 71 and an auxiliary press bar 81 (FIGS. 15A to 15C) as another press member may be provided. Auxiliary press bar 81 may act to apply a pressing pressure to laminated body 7 wound around hollow tube 5 in the step of pressing.

As shown in the schematic cross-sectional views in FIGS. 15A to 15C, one or two or more auxiliary press bars 81 may be arranged in the circumferential direction of the portion of laminated body 7 that is wound around hollow tube 5. For example, if one auxiliary press bar 81 is arranged as shown in FIG. 15A, auxiliary press bar 81 may be arranged at the position of 180° with respect to the position of 0° of press bar 71, in the circumferential direction of wound body 2. If two auxiliary press bars 81 are arranged as shown in FIG. 15B, two auxiliary press bars 81 may be arranged at respective positions of 120° and 240° for example with respect to the position of 0° of press bar 71, in the circumferential direction of wound body 2. If three auxiliary press bars 81 are arranged as shown in FIG. 15C, these auxiliary press bars 81 may be arranged at respective positions of 90°, 180°, and 270°, for example, with respect to the position of 0° of press bar 71, in the circumferential direction of wound body 2. It is preferable that press bar 71 and one or two or more auxiliary press bars 81 are thus arranged at regular intervals in the circumferential direction of wound body 2.

Preferably, auxiliary press bar(s) 81 is provided, if the pressing by press bar 71 causes a large amount of flexure of hollow tube 5 and/or the portion of laminated body 7 wound around hollow tube 5 (this laminated body 7 may be wound body 2 made up of laminated body 7). Preferably, auxiliary press bar(s) 81 that is held in parallel with the axial direction of laminated body 7/wound body 2 is pressed against laminated body 7 wound around hollow tube 5 or against wound body 2. Preferably, auxiliary press bar(s) 81 to be pressed is not the one that is curved toward laminated body 7 wound around hollow tube 5 or toward wound body 2 like press bar 71 shown in FIG. 5B.

Auxiliary press bar 81 is not particularly limited, as long as it can be pressed against the portion of laminated body 7 wound around hollow tube 5 (this laminated body 7 may be wound body 2 made up of laminated body 7). As auxiliary press bar 81, for example, a plate-shaped member or a rod-shaped member of resin or metal such as stainless steel, a plate-shaped or rod-shaped elastic body, a roll, or the like, may be used. Auxiliary press bar 81 may be pressed against the whole or a part of the axial length of the portion of laminated body 7 wound around hollow tube 5.

Figure 6A:
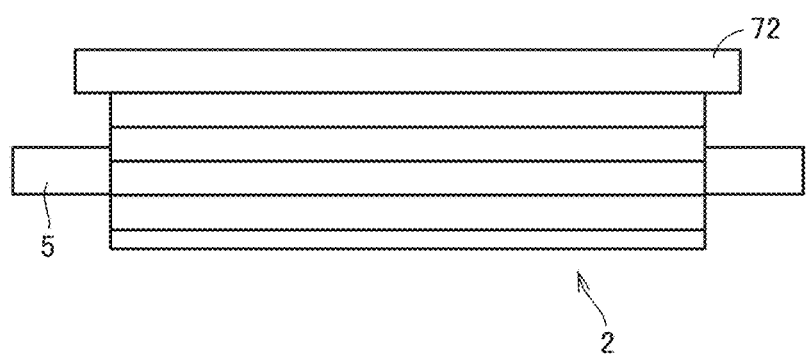
FIGS. 6A and 6B are each a schematic view showing another example step of manufacturing method for a separation membrane element of the present invention.
Figure 6B:
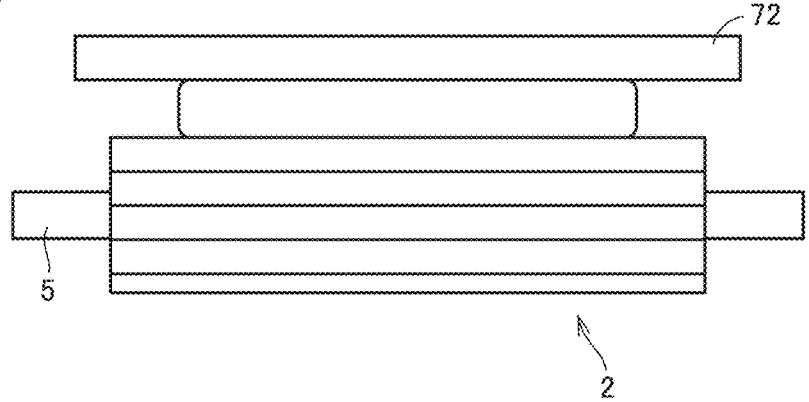

As shown in FIGS. 6A and 6B, a diaphragm 72 made of an elastic body of rubber, metal, or the like may be used as the press member. Diaphragm 72 may be deformed by being expanded for example by air pressure or hydraulic pressure (FIG. 6B), and therefore, it is possible to adjust the pressing pressure applied to the region that is to form the first-side sealant region, the region that is to form the second-side sealant region, and the region that is to form the end sealant region, of laminated body 7 wound around hollow tube 5, or wound body 2.

In the step of pressing of the manufacturing method for separation membrane element 1 using diaphragm 72 as shown in FIGS. 6A and 6B as the press member, preferably diaphragm 72 that is not expanded (FIG. 6A) is used for the purpose of applying the pressing pressure mainly to the region that is to form the first-side sealant region and the region that is to form the second-side sealant region. Moreover, preferably, diaphragm 72 that is expanded (FIG. 6B) is used for the purpose of applying the pressing pressure mainly to the region that is to form the end sealant region.

Figure 7A:
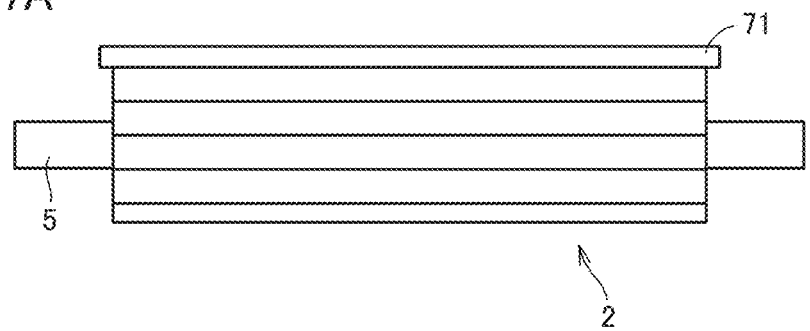
FIGS. 7A and 7B are each a schematic view showing still another example step of manufacturing method for a separation membrane element of the present invention.
Figure 7B:
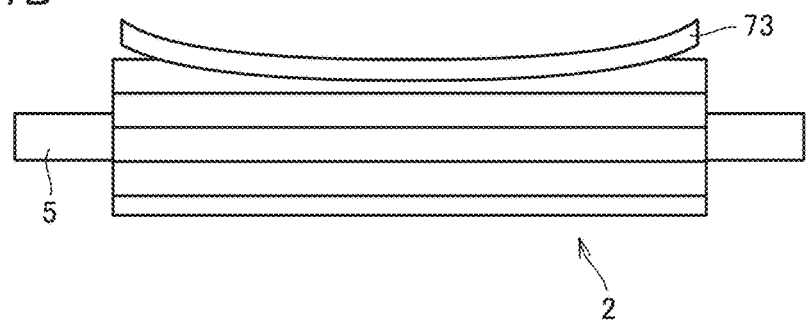

As shown in FIGS. 7A and 7B, a plate-shaped or rod-shaped elastic body 73 may be used as the press member. Elastic body 73 is a plate-shaped member or a rod-shaped member extending in the axial direction of hollow tube 5. The material forming elastic body 73 may be rubber, metal, or the like. The cross-sectional shape of plate-shaped or rod-shaped elastic body 73 is not particularly limited, and may be any of circle, ellipse, oval, polygon such as triangle or rectangle, a shape including a curved portion and a straight portion, and the like. Elastic body 73 may be deformed to be curved (FIG. 7B), for example, by hydraulic pressure, air pressure, or the like, to thereby adjust the pressing pressure applied to the region that is to form the first-side sealant region, the region that is to form the second-side sealant region, and the region that is to form the end sealant region, of laminated body 7 wound around hollow tube 5, or wound body 2.

In the step of pressing of the manufacturing method for separation membrane element 1 using elastic body 73 as shown in FIGS. 7A and 7B as the press member, preferably elastic body 73 that is not deformed (FIG. 7A) is used for the purpose of applying the pressing pressure mainly to the region that is to form the first-side sealant region and the region that is to form the second-side sealant region. Moreover, preferably, elastic body 73 that is curved toward hollow tube 5 (FIG. 7B) is used for the purpose of applying the pressing pressure mainly to the region that is to form the end sealant region.

Figure 8:
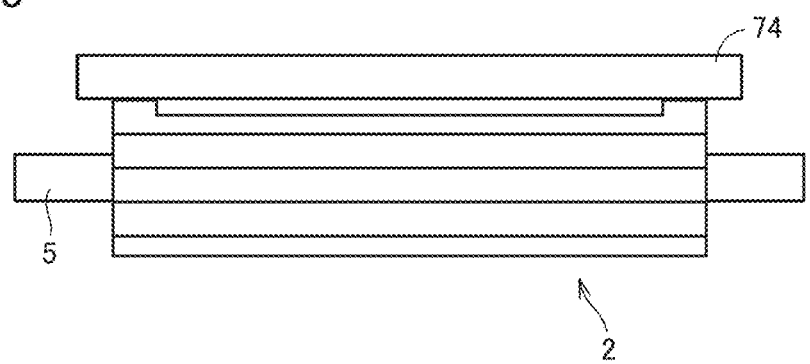
FIG. 8 is a schematic view showing a further example step of manufacturing method for a separation membrane element of the present invention.

As shown in FIG. 8, a plate-shaped or rod-shaped stepped member 74 may be used as the press member. Stepped member 74 may be formed from a material such as metal or rubber so that a step is formed on the side that faces laminated body 7. In plate-shaped or rod-shaped stepped member 74, the step and the support portion supporting the step may have either the same or different cross-sectional shapes, and the cross-sectional shape may be any of circle, ellipse, oval, polygon such as triangle or rectangle, a shape including a curved portion and a straight portion, and the like, for example. The step may be 1 mm or more, for example. When stepped member 74 is used, the force with which stepped member 74 is pressed can be adjusted to thereby adjust the pressing pressure applied to the region that is to form the first-side sealant region, the region that is to form the second-side sealant region, and the region that is to form the end sealant region in laminated body 7 wound around hollow tube 5 or in wound body 2. Applying the manufacturing method for separation membrane element 1 using stepped member 74 as the press member, in the step of pressing, the pressing pressure can be applied simultaneously to the region that is to form the first-side sealant region, the region that is to form the second-side sealant region, and the region that is to form the end sealant region.

In the foregoing description of stepped member 74 shown in FIG. 8, the member has a single step, by way of example. The member may have a plurality of steps and, in this case, the size and/or the height of the step may be varied depending on each step.

Moreover, a crown roll having a relatively larger diameter at the axial center of the crown roll may be used as the press member to apply, like stepped member 74 shown in FIG. 8, different pressing pressures to the region that is to form the first-side sealant region, the region that is to form the second-side sealant region, and the region that is to form the end sealant region in laminated body 7 wound around hollow tube 5 or in wound body 2.

Figure 9:
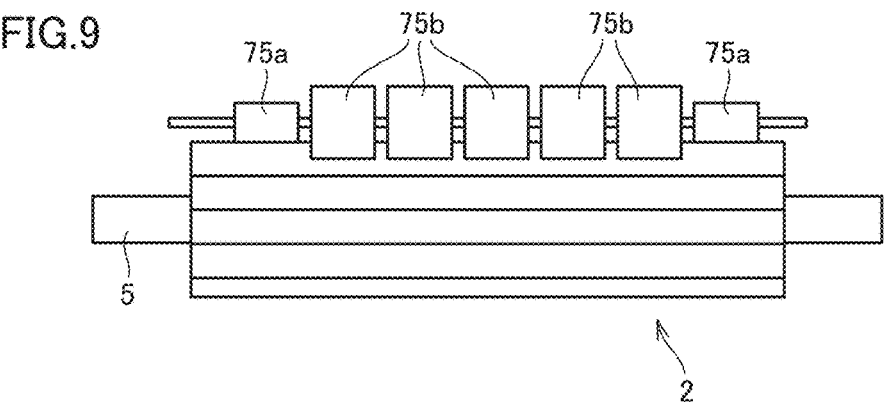
FIG. 9 is a schematic view showing a still further example step of manufacturing method for a separation membrane element of the present invention.

As shown in FIG. 9, a plurality of rolls 75a, 75b that are different in diameter and attached in series along the axial direction of hollow tube 5 may be used as the press member. In this case, preferably, among a plurality of rolls, a roll having a relatively smaller diameter may be used for the purpose of applying the pressing pressure to the region that is to form the first-side sealant region and the region that is to form the second-side sealant region, and a roll having a relatively larger diameter may be used for the purpose of applying the pressing pressure to the region that is to form the end sealant region. In this way, like the stepped member shown in FIG. 8, these rolls can apply different pressing pressures to the region that is to form the first-side sealant region, the region that is to form the second-side sealant region, and the region that is to form the end sealant region in laminated body 7 wound around hollow tube 5 or in wound body 2. The number of rolls to be pressed against each of the region that is to form the first-side sealant region, the region that is to form the second-side sealant region, and the region that is to form the end sealant region may be selected depending on the length of each of the region that is to form the first-side sealant region, the region that is to form the second-side sealant region, and the region that is to form the end sealant region, and the axial length of the roll, for example. In the forgoing description of the press member shown in FIG. 9, the rolls located at the opposite ends have a relatively smaller diameter and the rolls located therebetween have a relatively larger diameter, by way of example. Alternatively, the roll diameter may be gradually decreased from the axially central region toward each of the opposite ends of wound body 2. In this way as well, different pressing pressures can be applied to the region that is to form the first-side sealant region, the region that is to form the second-side sealant region, and the region that is to form the end sealant region in laminated body 7 wound around hollow tube 5 or in wound body 2.

Figure 10:
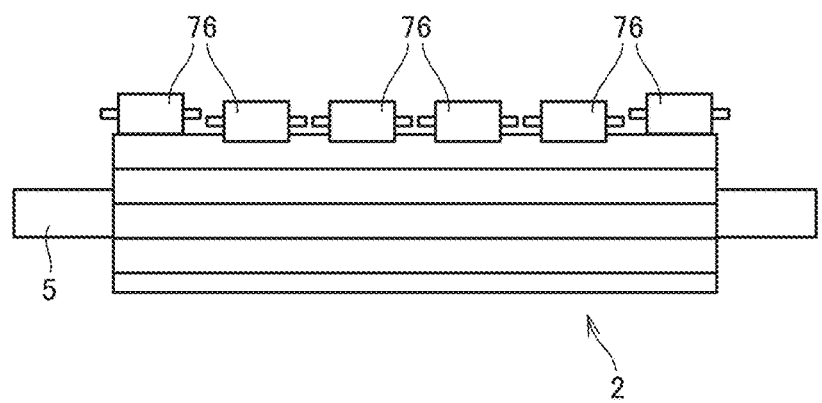
FIG. 10 is a schematic view showing a still further example step of manufacturing method for a separation membrane element of the present invention.

As shown in FIG. 10, a plurality of rolls 76 that have the same diameter and attached in series along the axial direction of hollow tube 5 may be used as the press member. In this case, as shown in FIG. 10, the amount of displacement of each roll toward hollow tube 5 (the pressing strength of each roll) may be adjusted independently to thereby adjust the pressing pressure applied to each of the region that is to form the first-side sealant region, the region that is to form the second-side sealant region, and the region that is to form the end sealant region in laminated body 7 wound around hollow tube 5 of in wound body 2. Moreover, the displacement of rolls 75a, 75b shown in FIG. 9 may also be controlled independently, like rolls 76 shown in FIG. 10.

Figure 11A:
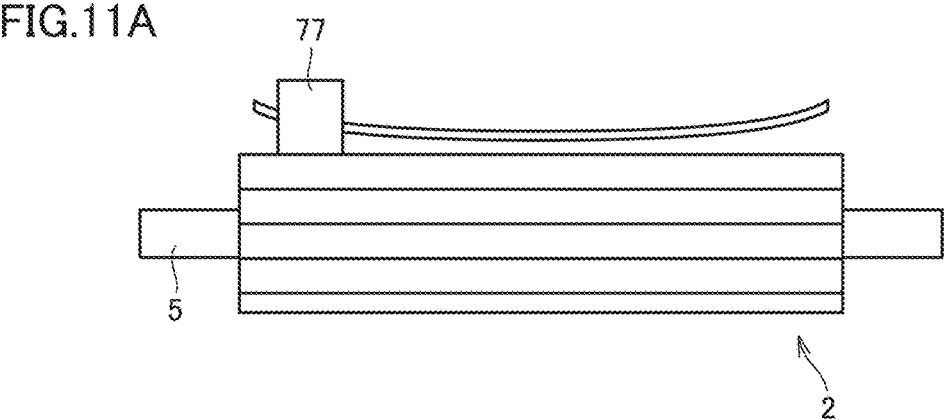
FIGS. 11A to 11C are each a schematic view showing a still further example step of manufacturing method for a separation membrane element of the present invention.
Figure 11B:
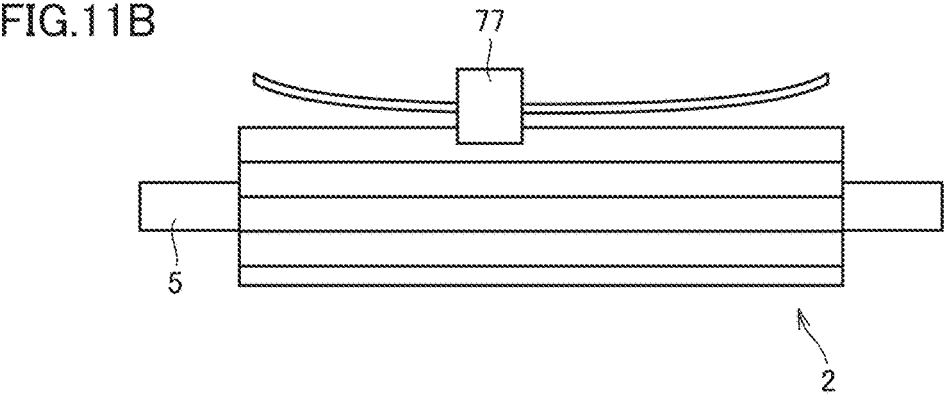
Figure 11C:
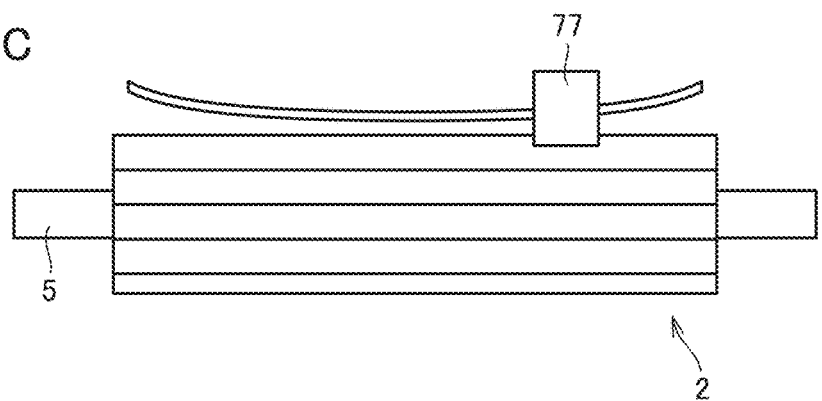

As shown in FIGS. 11A to 11C, a roll 77 that is attached to a support shaft curved toward hollow tube 5 and that is movable along the support shaft may be used as the press member. In this case, as shown in FIGS. 11A to 11C, roll 77 moves along the support shaft to thereby change the distance between roll 77 and the outer periphery of laminated body 7 wound around hollow tube 5 or the wound body 2, and accordingly change the pressing strength of roll 77 along the axial direction. Thus, the pressing pressure applied to each of the region that is to form the first-side sealant region, the region that is to form the second-side sealant region, and the region that is to form the end sealant region in laminated body 7 wound around hollow tube 5 or in wound body 2 can be adjusted.

Figure 12:
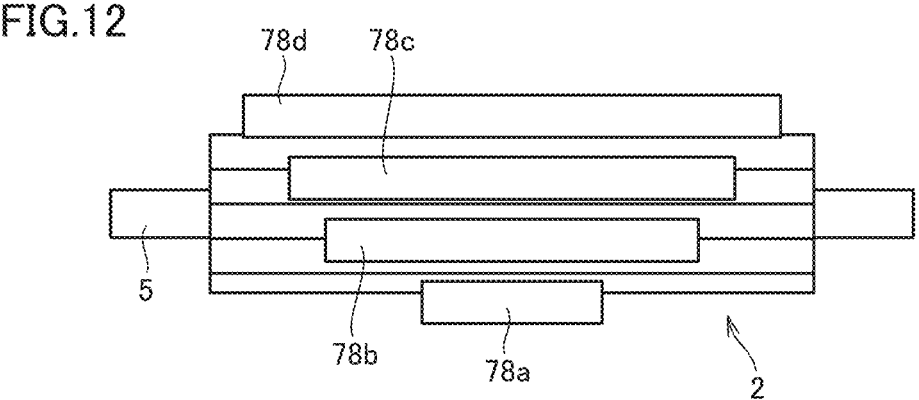
FIG. 12 is a schematic view showing a still further example step for manufacturing a separation membrane element of the present invention.
Figure 13:
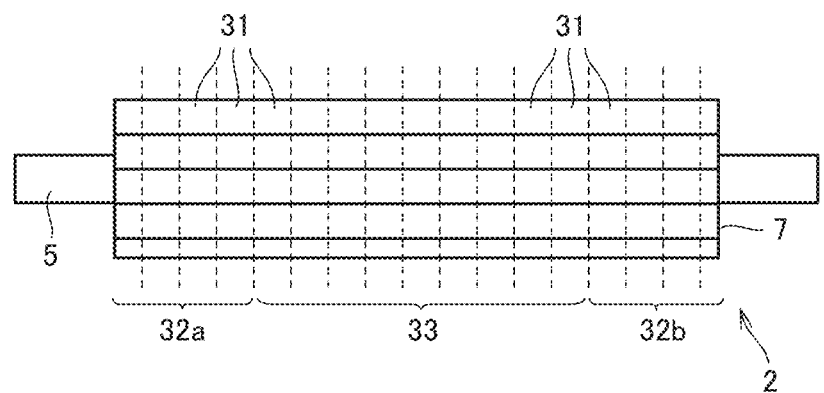
FIG. 13 is a schematic view shown for the sake of convenience for illustrating a pressure measurement region specified for measuring the pressing pressure in a step of manufacturing method for a separation membrane element of the present invention.

As shown in FIG. 12, a plurality of rolls 78a to 78d that are different in length in the axial direction of hollow tube 5 may be used as the press member. In this case, the roll having a shorter axial direction may be configured to apply no pressing pressure to the region that is to form the first-side sealant region and the region that is to form the second-side sealant region in laminated body 7 wound around hollow tube 5 or in wound body 2, and to apply the pressing pressure to the region that is to form the end sealant region. Moreover, the amount of displacement of each roll toward hollow tube 5 (the pressing strength of each roll) may be varied depending on each roll. Thus, the pressing pressure applied to each of the region that is to form the first-side sealant region, the region that is to form the second-side sealant region, and the region that is to form the end sealant region in laminated body 7 wound around hollow tube 5 or in wound body 2 can be adjusted.

As the press member used for the manufacturing method for separation membrane element 1, only one type, or a combination of two or more types of the press members illustrated exemplarily in FIG. 5A to FIG. 12 may be used.

Manufacturing Apparatus for Separation Membrane Element A manufacturing apparatus for a spiral-wound type separation membrane element of the present embodiment is a manufacturing apparatus for a spiral-wound type separation membrane element including: perforated hollow tube 5; and laminated body 7 including separation membrane sheet 10 and wound around hollow tube 5. The manufacturing apparatus includes:

a support part configured to rotatably support opposite ends, in an axial direction, of hollow tube 5;

a rotational driver part configured to rotate hollow tube 5; and a press part configured to be pressed against a portion of laminated body 7, the portion being wound around hollow tube 5, the press part including:

a press member; and a pressing pressure adjuster configured to adjust a pressing pressure applied by the press member against laminated body 7, the press member including:

a first-end press portion and a second-end press portion configured to be pressed against respective opposite end regions at opposite ends, in the axial direction, of laminated body 7 wound around hollow tube 5; and a central press portion located between the first-end press portion and the second-end press portion.

This manufacturing apparatus for separation membrane element 1 can be used to perform the above-described manufacturing method for a separation membrane element. The support part is not particularly limited as long as it can rotatably support the axially opposite ends of hollow tube 5. The rotational driver part is not particularly limited as long as it can apply a rotational drive force for rotating hollow tube 5, and may for example be a motor applying a rotational drive force to hollow tube 5, or a drive roller applying a rotational drive force to the portion of laminated body 7 wound around hollow tube 5 to thereby rotate hollow tube 5. The press part includes the press member and the pressing pressure adjuster. As the press member, any of the press members illustrated exemplarily in FIGS. 5A to 12 and 15A to 15C may be used. The press member may include the first-end press portion to be pressed against the first-side sealant region, the second-end press portion to be pressed against the second-side sealant region, and the central press portion to be pressed against the end sealant region, in laminated body 7 wound around hollow tube 5 or in wound body 2.

The pressing pressure adjuster controls the pressing pressure applied by the press member to laminated body 7 wound around hollow tube 5 or to wound body 2, so that different pressing pressures are applied to the region that is to form the first-side sealant region, the region that is to form the second-side sealant region, and the region that is to form the end sealant region, in laminated body 7 wound around hollow tube 5, or in wound body 2. When the press member is any of those shown in FIGS. 5A and 5B, FIGS. 7A to 10, 12, and 15A to 15C, the pressing pressure adjuster may be a cylinder mechanism (such as air cylinder or hydraulic cylinder) that presses the press member against laminated body 7 wound around hollow tube 5 or against wound body 2. When the press member is a diaphragm as shown in FIGS. 6A and 6B, the pressing pressure adjuster may be a mechanism for deforming (expanding) the diaphragm (mechanism adjusting the air pressure or hydraulic pressure). When the press member is the roll as shown in FIGS. 11A to 11C, the pressing pressure adjuster may be a mechanism for moving the support shaft for roll 77 or moving roll 77 along the support shaft. Preferably, the pressing pressure adjuster controls the pressing pressure so that the press member is pressed against laminated body 7 wound around hollow tube 5 or against wound body 2 while the rotational driver part is rotating hollow tube 5.

In the manufacturing apparatus for a separation membrane element, the pressing pressure adjuster adjusts the pressing pressure to satisfy respective relations defined by formulas (1') and (2'):

$$0.1 \times Ps1' \leq Pe' \quad (1'), \text{ and}$$

$$0.1 \times Ps2' \leq Pe' \quad (2').$$

Ps1' and Ps2' may be the same value or different values.

In the above formulas (1') and (2'), Ps1', Ps2', and Pe' have the following meanings. Specifically, supposing that a plurality of pressure measurement regions are defined successively along an entire length in the axial direction of laminated body 7 wound around hollow tube 5, Ps1' is a maximum value of respective time-average pressing pressures in one or more pressure measurement regions which are a part of the plurality of pressure measurement regions and against which the first-end press portion is pressed, the time-average pressing pressure in each pressure measurement region is a time average of a pressing pressure of 10 kPa or more applied to the pressure measurement region by the first-end press portion, for a time period for which the pressing pressure is applied, Ps2' is a maximum value of respective time-average pressing pressures in one or more pressure measurement regions which are a part of the plurality of pressure measurement regions and against which the second-end press portion is pressed, the time-average pressing pressure in each pressure measurement region is a time average of a pressing pressure of 10 kPa or more applied to the pressure measurement region by the second-end press portion, for a time period for which the pressing pressure is applied, and Pe' is a maximum value of respective time-average pressing pressures in one or more pressure measurement regions which are a part of the plurality of pressure measurement regions and against which the central press portion is pressed, the time-average pressing pressure in each pressure measurement region is a time average of a pressing pressure of 10 kPa or more applied to the pressure measurement region by the central press portion, for a time period for which the pressing pressure is applied.

As described above, pressure measurement regions 31 may be defined by a surface pressure distribution measurement system (I-scan system manufactured by NITTA Corporation), and more specifically may be defined by the area of a sensor of the surface pressure distribution measurement system.

Ps1' in the above formula (1') is determined through the following procedure. First, the time-average pressing pressure for each pressure measurement region 31 against which the first-end press portion is pressed is calculated, as a time average of a pressing pressure of 10 kPa or more applied by the first-end press portion to this pressure measurement region 31, for a time period for which the pressing pressure is applied. Next, the maximum value, Ps1', of respective time-average pressing pressures calculated for respective pressure measurement regions 31 is determined. Here, the time period for which the pressing pressure is applied by the first-end press portion to pressure measurement region 31 is the total time period for which a pressing pressure of 10 kPa or more is applied to any of pressure measurement regions 31 against which the first-end press portion is pressed. The time-average pressing pressure is the time average of the total pressing pressure (the value of the integral in a graph plotting the pressing pressure with respect to time) applied to pressure measurement regions 31 against which the first-end pressing portion is pressed, for the time period for which a pressing pressure of 10 kPa or more is applied by the first-end press portion to any of pressure measurement regions 31, for the total time period for which a pressing pressure of 10 kPa or more is applied to any of pressure measurement regions 31 against which the first-end press portion is pressed.

Ps2' in the above formula (2') may also be determined through a similar procedure. Specifically, first, the time-average pressing pressure for each pressure measurement region 31 against which the second-end press portion is pressed is calculated, as a time average of a pressing pressure of 10 kPa or more applied by the second-end press portion to this pressure measurement region 31, for a time period for which the pressing pressure is applied. Next, the maximum value, Ps2', of respective time-average pressing pressures calculated for respective pressure measurement regions 31 is determined. Here, the time period for which the pressing pressure is applied by the second-end press portion to pressure measurement region 31 is the total time period for which a pressing pressure of 10 kPa or more is applied to any of pressure measurement regions 31 against which the second-end press portion is pressed. The time-average pressing pressure is the time average of the total pressing pressure (the value of the integral in a graph plotting the pressing pressure with respect to time) applied to pressure measurement region 31 against which the second-end press portion is pressed, for the time period for which a pressing pressure of 10 kPa or more is applied by the second-end press portion to any of pressure measurement regions 31, for the total time period for which a pressing pressure of 10 kPa or more is applied to any of pressure measurement regions 31 against which the second-end press portion is pressed.

Pe' included in the above formulas (1') and (2') is also determined similarly. Specifically, first, the time-average pressing pressure for each pressure measurement region 31 against which the central press portion is pressed is calculated, as a time average of a pressing pressure of 10 kPa or more applied by the end press portion to this pressure measurement region 31, for a time period for which the pressing pressure is applied. Next, the maximum value, Pe', of respective time-average pressing pressures calculated for respective pressure measurement regions 31 is determined. Here, the time period for which the pressing pressure is applied by the central press portion to pressure measurement region 31 is the total time period for which a pressing pressure of 10 kPa or more is applied to any of pressure measurement regions 31 against which the central press portion is pressed. The time-average pressing pressure is the time average of the total pressing pressure (the value of the integral in a graph plotting the pressing pressure with respect to time) applied to pressure measurement region 31 against which the central portion is pressed, for the time period for which a pressing pressure of 10 kPa or more is applied by the central press portion to any of pressure measurement regions 31, for the total time period for which a pressing pressure of 10 kPa or more is applied to any of pressure measurement regions 31 against which the central press portion is pressed.

Preferably, the pressing pressure adjuster adjusts the pressing pressure to satisfy respective relations defined by formulas (3') and (4'):

$$1.1 \times Ps1' \leq Pe' \qquad (3'), \text{ and}$$

$$1.1 \times Ps2' \leq Pe' \qquad (4').$$

The fact that Pe' is more than or equal to Ps1' times 0.1 and more than or equal to Ps2' times 0.1 allows the sealant applied to the end portion of separation membrane unit 9 to easily spread and easily penetrate in permeate-side channel member 4 or a part of the members forming membrane leaf 6 as required, in manufacturing separation membrane element 1. Thus, formation of the sealing part with improved sealing property is facilitated. Pe' is preferably more than or equal to Ps1' times 0.3 and more than or equal to Ps2' times 0.3, more preferably more than or equal to Ps1' times 0.5 and more than or equal to Ps2' times 0.5, and still more preferably more than or equal to Ps1' times 0.7 and more than or equal to Ps2' times 0.7. Moreover, Pe' is preferably less than or equal to Ps1' times 1.1 and less than or equal to Ps2' times 1.1, and more preferably less than or equal to Ps1' times 1.0 and less than or equal to Ps2' times 1.0. The fact that Pe' is more than Ps1' times 1.1 and more than Ps2' times 1.1 makes it more likely that a resin layer in a gel form, particularly if included in separation membrane sheet 10, is crushed.

In the manufacturing apparatus for separation membrane element 1 of the present embodiment, the pressing pressure adjuster causes press bar 71 to be pressed against laminated body 7 wound around hollow tube 5 to satisfy respective relations defined by the above formulas (1') to (4'), as described above. Accordingly, sealant 8 on first-side portion 9a and second-side portion 9b as well as sealant 8 on end portion 9c spread and/or penetrate properly, to enable the sealant to be located over the range to be sealed by the sealant. Thus, the sealing part can be formed that can prevent mixture of the source fluid and the permeate fluid in separation membrane element 1.

The manufacturing apparatus for separation membrane element 1 of the present embodiment may include a guide member for guiding pressing against laminated body 7 wound around hollow tube 5 (this laminated body 7 may be wound body 2 made up of laminated body 7), to the extent that does not affect Ps1', Ps2', and Pe' in the above formulas (1') to (4') (i.e., for pressing with a pressing pressure of less than 10 kPa). As this guide member, the above-described one may be used.

The manufacturing apparatus for separation membrane element 1 of the present embodiment may include a reinforcement member for suppressing flexure of hollow tube 5. The reinforcement member can be inserted in hollow tube 5 for use. As this reinforcement member, the above-described one may be used.

In the following, each member forming separation membrane element 1, as well as a separation membrane module for which separation membrane element 1 is used are described.

Separation Membrane Sheet

Figure 14:
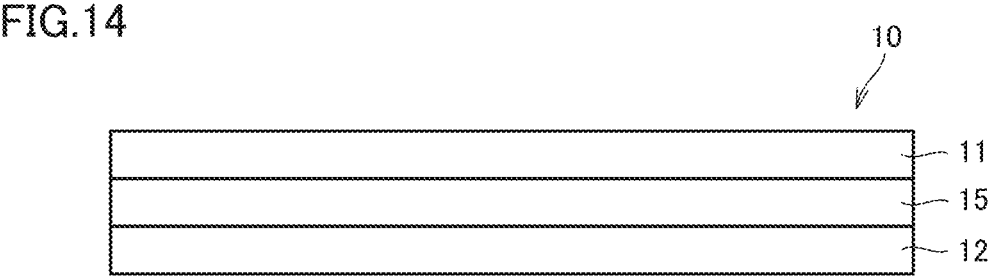
FIG. 14 is a schematic cross-sectional view showing an example separation membrane included in a separation membrane element of the present invention.

FIG. 14 is a schematic cross-sectional view showing an example of the separation membrane sheet. Separation membrane sheet 10 includes a separation function layer that selectively allows a specific fluid component to permeate. The separation function layer may for example be a resin layer in a gel form. When the separation function layer is a resin layer in a gel form, preferably separation membrane sheet 10 includes, as shown in FIG. 14, a first porous layer 11 and a resin layer 15 disposed on first porous layer 11, and may include a second porous layer 12 on the side of resin layer 15 opposite to first porous layer 11.

Preferably, first porous layer 11 and second porous layer 12 have a porosity with a high fluid permeability so as not to cause a diffusion resistance for the source fluid fed to resin layer 15, particularly for a fluid component selectively allowed to permeate resin layer 15, among components contained in the source fluid.

Each of first porous layer 11 and second porous layer 12 preferably contains a resin material. Examples of the resin material contained in first porous layer 11 and second porous layer 12 may include polyolefin resins such as polyethylene (PE) and polypropylene (PP); fluorine-containing resins such as polytetrafluoroethylene (PTFE), polyvinyl fluoride (PVF), and polyvinylidene fluoride (PVDF); polyester resins such as polystyrene (PS), polyethylene terephthalate (PET), and polyethylene naphthalate; and resin materials such as polyethersulfone (PES), polyphenylene sulfide (PPS), polysulfone (PSF), polyacrylonitrile (PAN), polyphenylene oxide (PPO), polyamide (PA), polyimide (PI), polyetherimide (PEI), polyetheretherketone (PEEK), high-molecular-weight polyesters, heat-resistant polyamides, aramids, and polycarbonates. Among these, in views of water repellency, polypropylene (PP) or a fluorine-containing resin is preferable. Moreover, first porous layer 11 and second porous layer 12 may contain, in addition to the aforementioned resin material, an inorganic material such a metal, glass, or ceramic, and may contain both the inorganic material and the resin material. The material forming first porous layer 11 and the material forming second porous layer 12 may be the same material or different materials.

For the purpose, for example, of further imparting a strength to first porous layer 11 and second porous layer 12, a porous body may further be disposed on respective surfaces of first porous layer 11 and second porous layer 12 that are not in contact with resin layer 15. As the porous body, non-woven or woven fabric containing any of the resin materials and inorganic materials described above in connection with first porous layer 11 and second porous layer 12, or both the resin and inorganic materials, may suitably be used.

When the separation membrane sheet acts to selectively allow an acid gas to permeate, the gel-form resin layer forming the separation function layer preferably contains a hydrophilic resin having a hydrophilic group such as a hydroxyl group or an ion exchange group, and may further contain a substance that reversibly reacts with an acid gas (the substance may also be referred to as "acid gas carrier" hereinafter). The acid gas refers herein to carbon dioxide ($CO_2$), hydrogen sulfide ($H_2S$), carbonyl sulfide, sulfur oxide ($SO_x$), nitrogen oxide ($NO_x$), or hydrogen halide such as hydrogen chloride.

The polymer forming the hydrophilic resin preferably has, for example, a structural unit derived from an alkyl acrylate, an alkyl methacrylate, a vinyl ester of a fatty acid, or a derivative thereof. It is more preferable that the hydrophilic resin contains a crosslinking-type hydrophilic resin in which molecular chains are crosslinked to form a network structure, exhibiting a high water-holding property. The crosslinking-type hydrophilic resin may be prepared by causing a polymer exhibiting hydrophilicity to react with a crosslinking agent, or may also be prepared by copolymerizing a monomer that serves as the raw material of the polymer exhibiting hydrophilicity with a crosslinkable monomer. The crosslinking agent or the crosslinkable monomer is not particularly limited, and a conventionally known crosslinking agent or crosslinkable monomer may be used. As the crosslinking method, any conventionally known method may be used.

The acid gas carrier is preferably a carbonate, a bicarbonate, or a hydride of at least one alkaline metal selected from the group consisting of Na, K, Rb, and Cs, and one, or two or more of them may be used as the acid gas carrier.

Resin layer 15 may contain, for example, a hydration reaction catalyst for the acidic gas, a surfactant, and the like, as an additive, in addition to the hydrophilic resin and the acid gas carrier as described above. The hydration reaction catalyst for the acid gas preferably contains an oxo acid compound, more preferably contains at least one elemental oxo acid compound selected from the group consisting of group 14 elements, group 15 elements, and group 16 elements, and still more preferably contains at least one selected from the group consisting of a tellurious acid compound, a selenious acid compound, an arsenious acid compound, and an orthosilicic acid compound. The surfactant is not particularly limited, and any of conventionally known surfactants such as polyoxyethylene polyoxypropylene glycols, polyoxyethylene alkyl phenyl ethers, polyoxyethylene alkyl ethers, fluorine-based surfactants, and silicone-based surfactants, for example, may be used. A single kind of surfactant may be used alone, or two or more kinds of surfactants may be used in combination.

Feed-Side Channel Member and Permeate-Side Channel Member

Feed-side channel member 3 and permeate-side channel member 4 preferably have a function as a spacer for forming a channel for the source fluid and the permeate fluid, and a function of generating turbulent flow in the source fluid and the permeate fluid, and therefore, any of those having a network shape (net shape, mesh shape, or the like) is suitably used. Depending on the shape of the network, the channel for the fluid varies. Therefore, the shape of the unit cell in the network is preferably selected, depending on the purpose, from shapes such as a square, a rectangle, a rhombus, and a parallelogram, for example. The material for feed-side channel member 3 is not particularly limited. While the material for permeate-side channel member 4 is not particularly limited, the material is preferably a resin (PP, PE, PET, or the like) in a network shape having openings of mesh #10 to #400, or a tricot shape having openings of mesh #10 to #400.

Hollow Tube

Hollow tube 5 is a conduit for collecting the permeate fluid that has permeated separation membrane sheet 10 and discharging the permeate fluid from separation membrane element 1. Hollow tube 5 is preferably made of a material that has a mechanical strength for enduring winding of laminated body 7 around hollow tube 5. As shown in FIGS. 2A and 2B, hollow tube 5 has a plurality of holes 50 in the outer peripheral surface of hollow tube 5, for allowing a permeate-fluid channel space formed by permeate-side channel member 4 to communicate with the internal space in hollow tube 5.

Sealing Part and Sealant

The sealing part is provided for preventing mixture of the source fluid and the permeate fluid, and may be formed by a sealant penetrating in and solidified in permeate-side channel member 4 and first porous layer 11 or second porous layer 12 in separation membrane sheet 10, for example. As the sealant, any material commonly used as an adhesive, or a thermal bonding adhesive tape may be used. Examples of the adhesive may include thermosetting adhesive, thermal bonding adhesive, active energy-ray curable adhesive, and the like.

Examples of the resin contained in the adhesive used for the sealant may include, for example, epoxy resin, urethane resin, silicone resin, vinyl chloride copolymer resin, vinyl chloride-vinyl acetate copolymer resin, vinyl chloride-vinylidene chloride copolymer resin, vinyl chloride-acrylonitrile copolymer resin, butadiene-acrylonitrile copolymer resin, polyamide resin, polyvinyl butyral resin, polyester resin, cellulose derivative (nitrocellulose or the like) resin, styrene-butadiene copolymer resin, various synthetic rubber (elastomer) resins, phenol resin, urea resin, melamine resin, phenoxy resin, and urea formamide resin. Among these, epoxy resin (epoxy adhesive resin) is preferably used for the sealant.

The viscosity of the sealant may be selected appropriately depending, for example, on the materials for and the structures of membrane leaf 6 and permeate-side channel member 4. The viscosity may be usually 20 Pa·s or more, 30 Pa·s or more, or 40 Pa·s or more, and may be usually 250 Pa·s or less, 200 Pa·s or less, or 180 Pa·s or less. The amount of sealant 8 provided in separation membrane unit 9 may also be selected appropriately depending, for example, on the materials for and the structures of membrane leaf 6 and permeate-side channel member 4.

Outer Sheath

The outer sheath may be in the shape of a tape, or a sheet. Examples of the material forming the outer sheath may include metal, stainless steel, resin, and the like. As the resin, polypropylene, polyimide, or the like may be used.

Separation Membrane Module

Separation membrane element 1 may be used for a separation membrane module. The separation membrane module includes one or more separation membrane elements 1, and also includes a source fluid feed port (a portion communicating with a feed-side end 51 shown in FIG. 2A) for feeding the source fluid to separation membrane sheet 10, a permeate fluid discharge port (a portion communicating with a discharge port 52 shown in FIG. 2A) for discharging the permeate fluid that has permeated separation membrane sheet 10, and a retentate fluid discharge port (a portion communicating with a discharge-side end 53 shown in FIG. 2A) for discharging the source fluid that has not permeated separation membrane sheet 10. The source fluid feed port, the retentate fluid discharge port, and the permeate fluid discharge port may be provided in the main body of separation membrane element 1, or provided in a container for storing separation membrane element 1 (the container may also be referred to as "housing" hereinafter).

The housing can form a space for sealing the source fluid flowing in the separation membrane module. The housing may include, for example, a cylindrical member made of stainless steel or the like, and a blocking member for blocking the axially opposite ends of the cylindrical member. The housing may have any shape such as cylindrical shape or rectangular cylindrical shape. However, the housing preferably has a cylindrical shape since separation membrane element 1 usually has a cylindrical shape. A partition may be provided in the housing to prevent mixture of the source fluid fed to feed-side end 51 and the retentate fluid that has not permeated separation membrane sheet 10 provided in separation membrane element 1.

EXAMPLES

In the following, an Example and a Comparative Example are given to further describe the present invention specifically. The present invention, however, is not limited by these examples.

[Measurement of Ps1, Ps2, Pe]

In the manufacturing apparatus for a separation membrane element used for the Example and the Comparative Example, a laminated body with hollow tube fabricated for the Example and the Comparative Example was set. Between a rod-shaped member (press member) and the laminated body wound around the hollow tube, a surface pressure distribution measurement system (I-scan system manufactured by NITTA Corporation) having a sensor sheet (BIGMAT (width: 480 mm, length: 440 mm, thickness: 0.1 mm, measurement resolution (the area of a sensor): about 1 $cm^2$)) was placed. Through a similar procedure to the Example and the Comparative Example, the laminated body was wound and the pressing pressure at each pressure measurement region was measured. In the surface pressure distribution measurement system, 48 pressure measurement regions arranged successively along the whole axial length of the laminated body wound around the hollow tube or the wound body were provided. Accordingly, the pressing pressure applied to the region of the stacked three layers, i.e., the first porous layer, the separation function layer, and the second porous layer included in the laminated body, was recorded. Thus, the recorded data was arranged in time series to thereby obtain the time series data of the pressing pressure.

When the step of pressing was completed, the first-side sealant region, the second-side sealant region, and the end sealant region were identified in the wound body. These regions were associated with respective time series data of the pressing pressure measured in the above-described manner. From the time series data of the pressing pressure associated with each region, the total pressing pressure applied when a pressing pressure of 10 kPa or more was applied to the surface pressure measurement region of each region was calculated, and the time average pressure was calculated for the time for which the pressing pressure of 10 kPa or more was applied to each region. The maximum value of the time-average pressures in each region was determined as Ps1, Ps2, Pe. The determined Ps1, Ps2, and Pe correspond respectively to Ps1', Ps2', and Pe' described above in connection with the embodiment.

[Evaluation of Spread State of Spread of Sealant]

An outer-sheathed wound body obtained for each of the Example and the Comparative Example was left stationary at 60° C. for five hours or more to cure the adhesive. Then, the outer-sheathed wound body was decomposed into composites. The region corresponding to the end sealant region in each composite was divided into five equal parts in the axial direction of the wound body. For the sealant located in a central position in the axial direction in each of the five parts, the length in the circumferential direction in which the laminated body was wound was measured with a vernier caliper, the average thereof was calculated, and accordingly the spread state of the sealant was evaluated.

[Calculation of Diameters Ds, Dc]

In each of the first-side sealant region and the second-side sealant region of the outer-sheathed wound body obtained for each of the Example and the Comparative Example, the length of the circumference was measured at intervals of 5 mm from the end in the axial direction of the wound body, the maximum value thereof was determined as the diameter, supposing that the cross section of the outer-sheathed wound body was a perfect circle, and the average of the calculated two diameters of the first-side sealant region and second-side sealant region was determined as diameter Ds. Further, in the end sealant region of the outer-sheathed wound body obtained for each of the Example and the Comparative Example, the length of the circumference was measured at intervals of 5 mm from one end in the axial direction, the minimum value thereof was determined, and this diameter was determined as diameter Dc, supposing that the cross section of the outer-sheathed wound body was a perfect circle.

Example 1

Preparation of Sheet Material for Separation Membrane 188 parts by mass of water as a medium, 4 parts by mass of crosslinked polyacrylic acid ("AQUPEC HV-501" manufactured by SUMITOMO SEIKA CHEMICALS CO., LTD.) and 0.8 parts by mass of non-crosslinked polyacrylic acid ("AQUPAANA AP-40F" manufactured by SUMITOMO SEIKA CHEMICALS CO., LTD., 40% Na Saponified) as the resin for the separation function layer, and 10.5 parts by mass of cesium hydroxide hydrate as a neutralizing agent, were prepared and subjected to a neutralization reaction while being stirred. After this, 10 parts by mass of cesium carbonate as a carrier to reversibly react with $CO_2$, 1.5 parts by mass of potassium tellurite as a hydration reaction catalyst, and 1.2 parts by mass of a surfactant ("Surflon S-242" manufactured by AGC SEIMI CHEMICAL CO., LTD.) as an additive were added and mixed together to obtain a coating liquid.

Next, a hydrophobic porous PTFE membrane ("POREFLON HP-010-50" manufactured by SUMITOMO ELECTRIC FINE POLYMER INC., thickness: 50 μm pore size: 0.1 μm) as the first porous layer, and nonwoven fabric of PPS ("PS0100" manufactured by HIROSE PAPER MFG CO., LTD.) as a porous body were stacked together to prepare a laminate sheet. The coating liquid as described above was applied to the hydrophobic porous PTFE membrane in the laminate sheet, a hydrophobic porous PTFE membrane (the same as the above-described one) was laid as the second porous layer on the coating liquid, and the hydrophobic porous PTFE membrane after the coating was applied was dried at approximately 120° C. for approximately five minutes. Accordingly, the sheet material for the separation membrane having a layer structure: "porous body/first porous layer/separation function layer/second porous layer" was fabricated.

Fabrication of Separation Membrane

The fabricated sheet material was extended and cut into a cut piece of 540 mm in the width direction and 790 mm in the length direction. In the cut piece, a half cut (slit) was formed in the three layers (first porous layer, separation function layer, and second porous layer) other than the porous body. The outer periphery around the half cut was removed to thereby form a half-cut piece having the porous body of 540 mm in width and 790 mm in length and the aforementioned three layers of 470 mm in width and 740 mm in length on the porous body.

A sponge was immersed in a surfactant aqueous solution prepared by mixing a surfactant ("Surflon S-242" manufactured by AGC SEM/II CHEMICAL CO., LTD.) and water at 1:10, and the surfactant aqueous solution was applied to the circumferential edge of the second porous layer of the obtained half-cut piece, and air-dried for one hour or more. After the air-drying, a two-part epoxy adhesive (viscosity: 45000 cP, manufactured by AREMCO PRODUCTS) was applied with a feed amount of 0.015 g/mm to the circumferential edge of the second porous layer. With the applied adhesive in between, the half-cut piece and a porous body ("PS0100" manufactured by HIROSE PAPER MFG CO., LTD. (PPS non-woven fabric)) of 540 mm in width and 790 mm in length on the second porous layer were bonded together, to thereby fabricate a separation membrane.

Fabrication of Laminated Body with Hollow Tube

On the porous body on the second porous layer in the obtained separation membrane, a feed-side channel member (SUS wire mesh, 50×50 mesh, width: 500, length: 400) was placed, and the separation membrane was folded into two leaves with the feed-side channel member held therebetween, to thereby obtain a membrane leaf. On one surface of the obtained membrane leaf, a two-part epoxy adhesive (viscosity: 45000 cP, manufactured by AREMCO PRODUCTS) was applied as a sealant with a feed amount of 0.015 g/mm along the three edges other than the edge located along the fold. With the applied adhesive in between, the membrane leaf and the feed-side channel member (SUS wire mesh, a laminate structure of 50×50 mesh/100×100 mesh/50×50 mesh) of 500 mm in width and 400 mm in length were bonded together to obtain a composite. A similar procedure was repeated to fabricate 20 composites.

Next, a hollow tube (made of SUS, diameter: 50 mm, length: 1000 mm) having a plurality of holes in the outer surface along the width direction was fixed with an adhesive tape, on one end, in the lengthwise direction, of a lead spacer as a permeate-side channel member forming the outermost layer of the laminated body. Subsequently, the composite was disposed on the lead spacer so that the permeate-side channel member of the composite was exposed (so that the lead spacer faces the membrane leaf of the composite). At this time, the composite was disposed on the lead spacer so that the fold of the membrane leaf was located at a side of the hollow tube and the edge of the fold runs in parallel with the axial direction of the hollow tube. Subsequently, on the composite on the lead spacer, the procedure of disposing another composite so that the previously prepared permeate-side channel member is exposed was repeated, to obtain a laminated body with hollow tube in which 20 composites were stacked. The composites were stacked so that respective edges of the folds of the membrane leaves were offset (displaced) from each other in the direction orthogonal to the folds and away from the hollow tube.

Fabrication of Wound Body

The hollow tube on the fabricated laminated body with hollow tube was set on a winding chuck as a support part for the manufacturing apparatus for a separation membrane element. The apparatus includes a motor as a rotational driver part applying a rotational drive force to the winding chuck, a rod-shaped member (made of aluminum (A5052), cross-sectional shape: rectangle, area to be pressed against the laminated body: 20 mm in parallel with the radial direction of the hollow tube×60 mm in parallel with the axial direction of the hollow tube, thickness: 10 mm) as a press part to be pressed against the laminated body wound around the hollow tube, a whole-length cylinder for applying a pressing pressure over the lengthwise direction of the rod-shaped member (direction in parallel with the axial direction of the hollow tube)), and a deformation cylinder for applying a pressing pressure to a central portion, in the lengthwise direction, of the rod-shaped member so as to curve the rod-shaped member toward the hollow tube.

Next, the winding chuck of the manufacturing apparatus was connected to the motor to wind the laminated body at a rotational speed of 8 rpm. The winding was implemented by pressing the rod-shaped member against the portion of the laminated body wound on the hollow tube, the air pressure of the whole-length cylinder was adjusted to 0.2 MPa, the air pressure of the deformation cylinder was adjusted to 0.05 MPa, the rod-shaped member held in parallel with the axial direction of the hollow tube was pressed (Step A, FIG. 5A), and the whole length of the laminated body was wound around the hollow tube to thereby obtain a wound body. In this Step A, a pressing pressure of 10 kPa or more was applied to the first-side sealant region and the second-side sealant region, while the pressing pressure of 10 kPa or more was not applied to the end sealant region. Subsequently, the motor was stopped, the air pressure of the whole-length cylinder was adjusted to 0.2 MPa, the air pressure of the deformation cylinder was adjusted to 0.6 MPa, and the rod-shaped member, which was deformed so that a central portion in the lengthwise direction thereof was curved in an arc shape toward the central tube, was pressed against the wound body (Step B, FIG. 5B). After this, the motor was drive again and rotated at a rotational speed of 8 rpm for 30 seconds. During the period for which the motor was stopped, a pressing pressure of 10 kPa or more was applied to each of the first-side sealant region, the second-side sealant region, and the end sealant region. In Step B, a pressing pressure of 10 kPa or more was applied to the end sealant region, and a pressing pressure of 10 kPa or more was also applied to the first-side sealant region and second-side sealant region.

Subsequently, the air pressure of the whole-length cylinder was adjusted to 0.2 MPa, the air pressure of the deformation cylinder was adjusted to 0.05 MPa, an end of a polyimide tape of 100 mm in width was attached to an axially central portion of the wound body, the wound body was caused to make a single rotation, and accordingly the polyimide tape was wound around the wound body. While the wound body was kept rotated, the polyimide tape was shifted at a certain speed in the axial direction of the wound body, so that the polyimide tape was wound in a spiral manner toward one end in the axial direction of the wound body. Thus, the wound body was sheathed with the polyimide tape from the axially central portion to the one end of the wound body. Subsequently, the direction in which the polyimide tape was shifted was changed, and the polyimide tape was shifted at a certain speed in the axial direction of the wound body, so that the polyimide tape was wound in a spiral manner around the wound body toward the other end, in the axial direction, of the wound body. Thus, the wound body was sheathed with the polyimide tape from one end to the other end of the wound body. After this, the direction in which the polyimide tape was shifted was changed again so that the wound body was sheathed with the polyimide tape from the other end to the central portion in the axial direction of the wound body to thereby obtain an outer-sheathed wound body. In the step of winding the polyimide tape, a pressing pressure of 10 kPa or more was applied to the first-side sealant region and second-side sealant region, while the pressing pressure of 10 kPa or more was not applied to the end sealant region.

Based on the results of measurement of the pressing pressure applied to a plurality of pressure measurement regions defined on the portion of the laminated body wound around the hollow tube in the procedure [Measurement of Ps1, Ps2, Pe], the air pressure of the whole-length cylinder and the deformation cylinder was adjusted and the rod-shaped member was caused to press. Then, Ps1 and Ps1' were 118 kPa, Ps2 and Ps2' were 152 kPa, and Pe and Pe' were 52 kPa in the period from the start of Step A to the end of Step B (step of pressing).

For the resultant outer-sheathed wound body, the state of spread of the sealant was evaluated, and diameter Ds and diameter Dc were calculated. The results are shown in Table 1.

Comparative Example 1

An outer-sheathed wound body was obtained similarly to Example 1, except that the motor-stoppage period and Step B were not provided after the wound body was obtained in Step A. Based on the results of measurement of the pressing pressure applied to a plurality of pressure measurement regions defined on the portion of the laminated body wound around the hollow tube in the procedure [Measurement of Ps1, Ps2, Pe], the air pressure of the whole-length cylinder and the deformation cylinder was adjusted and the rod-shaped member was caused to press. Then, Ps1 and Ps1' were 118 kPa, Ps2 and Ps2' were 152 kPa, and Pe and Pe' were 9 kPa in the period from the start of Step A to the end of Step B (step of pressing).

For the resultant outer-sheathed wound body, the state of spread of the sealant was evaluated, and diameter Ds and diameter Dc were calculated. The results are shown in Table 1.

TABLE 1

|  | Example 1 | Comparative Example 1 |
|---|---|---|
| pressing pressure |  |  |
| Ps1, Ps1' [kPa] | 118 | 118 |
| Ps2, Ps2' [kPa] | 152 | 152 |
| Pe, Pe' [kPa] | 52 | 9 |
| spread state of sealant [mm] | 20.4 | 17.8 |
| diameter |  |  |
| Ds [mm] | 140.7 | 141.2 |
| first-side sealant region [mm] | 140.7 | 141.2 |
| second-side sealant region [mm] | 140.7 | 141.2 |
| Dc [mm] | 140.4 | 140.5 |

Although the present invention has been described and illustrated in detail, it is clearly understood that the same is by way of illustration and example only and is not to be taken by way of limitation, the scope of the present invention being interpreted by the terms of the appended claims.

What is claimed is:

1. A manufacturing method for a spiral-wound type separation membrane element, the spiral-wound type separation membrane element including:
- a hollow tube which is perforated; and
- a laminated body including a separation membrane, the laminated body being wound around the hollow tube, the manufacturing method comprising a step of pressing a press member against a portion of the laminated body, the portion of the laminated body being wound around the hollow tube, the laminated body including:
- a separation membrane unit which is a stack of
  - a membrane leaf including the separation membrane arranged to have facing portions that face each other, and a feed-side channel member in which a source fluid flows, the feed-side channel member being interposed between the facing portions of the separation membrane, and
  - a permeate-side channel member in which a permeate fluid permeated through the separation membrane flows; and
- a sealant disposed on at least one side of the separation membrane unit, the sealant being disposed on a first-side portion, a second-side portion, and an end portion of the separation membrane unit,
- the first-side portion and the second-side portion being to be located on respective opposite ends, in an axial direction, of the laminated body wound around the hollow tube to extend in a winding direction of the laminated body,
- the end portion being to be located on outer one of ends extending in the axial direction of the laminated body wound around the hollow tube, the press member being a plate-shaped member or a rod-shaped member that extends in an axial direction of the hollow tube, the step of pressing the press member against the portion of the laminated body being performed while
- rotating the hollow tube,
- holding the plate-shaped member or the rod-shaped member in parallel with the axial direction of the laminated body wound around the hollow tube,
- curving the plate-shaped member or the rod-shaped member toward the hollow tube and
- satisfying respective relations defined by formulas (1) and (2):

$$0.1 \times Ps1 \leq Pe \leq 1.1 \times Ps1 \quad (1),$$

$$0.1 \times Ps2 \leq Pe \leq 1.1 \times Ps2 \quad (2),$$

where supposing that
the laminated body wound around the hollow tube at a time when the step of pressing is completed has
- a first-side sealant region where the sealant disposed on the first-side portion of the separation membrane unit is located,
- a second-side sealant region where the sealant disposed on the second-side portion of the separation membrane unit is located, and
- an end sealant region where the sealant disposed on the end portion is located, wherein the end sealant region is located to extend between the first-side sealant region and the second-side sealant region, and that a plurality of pressure measurement regions are defined successively along an entire length in the axial direction of the laminated body wound around the hollow tube, $Ps1$ is a maximum value of respective time-average pressing pressures in pressure measurement regions constituting a first-side pressure measurement region, the pressure measurement regions are a part of the plurality of pressure measurement regions and include at least a part of the first-side sealant region, the time-average pressing pressure in each pressure measurement region is a time average of a pressing pressure of 10 kPa or more applied to the pressure measurement region, for a time period for which the pressing pressure of 10 kPa or more is applied to the first-side pressure measurement region, $Ps2$ is a maximum value of respective time-average pressing pressures in pressure measurement regions constituting a second-side pressure measurement region, the pressure measurement regions are a part of the plurality of pressure measurement regions and include at least a part of the second-side sealant region, the time-average pressing pressure in each pressure measurement region is a time average of a pressing pressure of 10 kPa or more applied to the pressure measurement region, for a time period for which the pressing pressure of 10 kPa or more is applied to the second-side pressure measurement region, and $Pe$ is a maximum value of respective time-average pressing pressures in pressure measurement regions constituting an end pressure measurement region, the pressure measurement regions are a part of the plurality of pressure measurement regions and located between the first-side pressure measurement region and the second-side pressure measurement region, the time-average pressing pressure in each pressure measurement region is a time average of a pressing pressure of 10 kPa or more applied to the pressure measurement region, for a time period for which the pressing pressure of 10 kPa or more is applied to the end pressure measurement region.

2. The manufacturing method for a spiral-wound type separation membrane element according to claim 1, the method further comprising winding an outer sheath around a wound body to form an outer-sheathed wound body, the wound body including the hollow tube and the laminated body wound around the hollow tube, wherein
the outer-sheathed wound body satisfies a relation defined by a formula (5):

$$0.8 \times Ds \leq Dc \leq Ds \quad (5)$$

where Ds and Dc are each a diameter of the outer-sheathed wound body, Ds is a diameter taken at opposite ends in the axial direction of the laminated body, and Dc is a diameter taken at a center in the axial direction.

3. The manufacturing method for a spiral-wound type separation membrane element according to claim 2, the method further comprising a step of curing the sealant of the outer-sheathed wound body.

4. The manufacturing method for a spiral-wound type separation membrane element according to claim 1, wherein the separation membrane includes a resin layer containing a hydrophilic resin.

5. The manufacturing method for a spiral-wound type separation membrane element according to claim 4, wherein
the source fluid is a gas containing water vapor and acid gas, and
the permeate fluid contains acid gas.

6. The manufacturing method for a spiral-wound type separation membrane element according to claim 5, wherein the resin layer includes a substance reacting reversibly with acid gas.

7. A manufacturing apparatus for a spiral-wound type separation membrane element,
the spiral-wound type separation membrane element including:
a hollow tube which is perforated; and
a laminated body including a separation membrane, the laminated body being wound around the hollow tube,
the apparatus comprising:
a support part configured to rotatably support opposite ends, in an axial direction, of the hollow tube;
a rotational driver part configured to rotate the hollow tube; and
a press part configured to be pressed against a portion of the laminated body, the portion being wound around the hollow tube,
the press part including:
a press member; and
a pressing pressure adjuster configured to adjust a pressing pressure applied by the press member against the laminated body,
the press member including:
a first-end press portion and a second-end press portion configured to be pressed against respective opposite end regions at opposite ends, in the axial direction, of the laminated body wound around the hollow tube; and
a central press portion located between the first-end press portion and the second-end press portion,
the press member being a plate-shaped member or a rod-shaped member that extends in the axial direction of the hollow tube, wherein
the pressing pressure adjuster is configured to cause the plate-shaped member or the rod-shaped member to be held in parallel with the axial direction of the laminated body wound around the hollow tube and to be curved toward the hollow tube, and is configured to adjust the pressing pressure to satisfy respective relations defined by formulas (1') and (2'):

$$0.1 \times Ps1' \leq Pe' \leq 1.1 \times Ps1' \quad (1'),$$

$$0.1 \times Ps2' \leq Pe' \leq 1.1 \times Ps2' \quad (2'),$$

where supposing that a plurality of pressure measurement regions are defined successively along an entire length in the axial direction of the laminated body wound around the hollow tube,
$Ps1'$ is a maximum value of respective time-average pressing pressures in one or more pressure measurement regions which are a part of the plurality of pressure measurement regions and against which the first-end press portion is pressed, the time-average pressing pressure in each pressure measurement region is a time average of a pressing pressure of 10 kPa or more applied to the pressure measurement region by the first-end press portion, for a time period for which the pressing pressure is applied,
$Ps2'$ is a maximum value of respective time-average pressing pressures in one or more pressure measurement regions which are a part of the plurality of pressure measurement regions and against which the second-end press portion is pressed, the time-average pressing pressure in each pressure measurement region is a time average of a pressing pressure of 10 kPa or more applied to the pressure measurement region by the second-end press portion, for a time period for which the pressing pressure is applied, and
$Pe'$ is a maximum value of respective time-average pressing pressures in one or more pressure measurement regions which are a part of the plurality of pressure measurement regions and against which the central press portion is pressed, the time-average pressing pressure in each pressure measurement region is a time average of a pressing pressure of 10 kPa or more applied to the pressure measurement region by the central press portion, for a time period for which the pressing pressure is applied.

* * * * *